US012810473B2

(12) United States Patent
Kastner et al.

(10) Patent No.: US 12,810,473 B2
(45) Date of Patent: Nov. 24, 2026

(54) IMAGING SYSTEMS AND METHODS FOR DIMENSION MEASUREMENT INDEPENDENT OF LASER ALIGNMENT

(71) Applicant: The Regents of the University of California, Oakland, CA (US)

(72) Inventors: Ryan Kastner, La Jolla, CA (US); Christopher L. Crutchfield, La Jolla, CA (US); Kyle Hu, La Jolla, CA (US); Nathan Hui, La Jolla, CA (US); Brice X. Semmens, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 19/172,386

(22) Filed: Apr. 7, 2025

(65) Prior Publication Data

US 2025/0315981 A1 Oct. 9, 2025

Related U.S. Application Data

(60) Provisional application No. 63/575,598, filed on Apr. 5, 2024.

(51) Int. Cl.
*G06T 7/80* (2017.01)
*G06T 7/12* (2017.01)
(Continued)

(52) U.S. Cl.
CPC .................. *G06T 7/80* (2017.01); *G06T 7/12* (2017.01); *G06T 7/155* (2017.01); *G06T 7/521* (2017.01);
(Continued)

(58) Field of Classification Search
CPC .... G06T 7/80; G06T 7/12; G06T 7/90; G06T 7/521; G06T 7/155; G06T 2207/10024; G06T 2207/30181
See application file for complete search history.

(56) References Cited

U.S. PATENT DOCUMENTS

| | | | | |
|---|---|---|---|---|
| 9,619,934 B2 * | 4/2017 | Andersson | .............. | G01S 17/89 |
| 10,068,347 B2 * | 9/2018 | Lee | ...................... | H04N 13/128 |

(Continued)

OTHER PUBLICATIONS

Zhang, et al., "A flexible new technique for camera calibration", IEEE Transactions on Pattern Analysis and Machine Intelligence 22, 11 (Nov. 2000), 1330-1334. https://doi.org/10.1109/34.888718.

(Continued)

*Primary Examiner* — Brian P Yenke

(74) *Attorney, Agent, or Firm* — Ashurst Perkins Coie US LLP

(57) ABSTRACT

Disclosed are imaging systems and methods for dimension measurement independent of laser alignment. An example method includes: obtaining an image of the object captured underwater using an underwater imaging system comprising a camera and a laser source, wherein the image includes a representation of the object and a laser spot incident on the object; identifying, in the image, at least two points of interest on the object; determining an image-space distance between the at least two points as represented in the image; determining a location of the laser spot within the image; estimating a camera-to-object distance based on the location of the laser spot within the image and a calibrated spatial relationship between the camera and the laser source; and estimating the physical dimension of the object based on the image-space distance using the camera-to-object distance.

19 Claims, 19 Drawing Sheets

(51) Int. Cl.
*G06T 7/155* (2017.01)
*G06T 7/521* (2017.01)
*G06T 7/90* (2017.01)

(52) U.S. Cl.
CPC ...... *G06T 7/90* (2017.01); *G06T 2207/10024* (2013.01); *G06T 2207/30181* (2013.01)

(56) References Cited

U.S. PATENT DOCUMENTS

| | | | | |
|---|---|---|---|---|
| 10,397,550 B2* | 8/2019 | Dumont | H04N 13/246 |
| 10,718,609 B2* | 7/2020 | Galin | G01B 11/00 |
| 11,113,539 B2* | 9/2021 | Atwater | A01K 61/13 |
| 11,212,512 B2* | 12/2021 | Schmidt | H04N 13/271 |
| 11,375,174 B2* | 6/2022 | Banks | H04N 23/74 |
| 11,475,689 B2* | 10/2022 | Young | G06T 7/70 |
| 12,100,201 B2* | 9/2024 | Shang | G01S 15/96 |
| 12,228,389 B2* | 2/2025 | Kobayashi | G03B 15/00 |
| 12,272,169 B2* | 4/2025 | Young | G06T 7/0012 |
| 2009/0250611 A1* | 10/2009 | Strandemar | H04N 13/25<br>382/106 |
| 2014/0285655 A1* | 9/2014 | Son | A61B 5/1075<br>600/407 |
| 2015/0317780 A1* | 11/2015 | Dumont | G01C 11/30<br>348/47 |
| 2015/0363914 A1* | 12/2015 | Boyle | H04N 5/265<br>345/629 |
| 2016/0249036 A1* | 8/2016 | Son | G01B 11/2513 |
| 2017/0046845 A1* | 2/2017 | Boyle | G06T 7/521 |
| 2020/0105019 A1* | 4/2020 | Boyle | H04N 23/90 |
| 2021/0209351 A1* | 7/2021 | Young | G06T 7/70 |
| 2023/0267731 A1* | 8/2023 | Shang | G01N 33/12<br>382/110 |
| 2023/0301280 A1* | 9/2023 | Aljapur | G06T 7/13 |
| 2025/0014202 A1* | 1/2025 | Nims | G01S 17/894 |

OTHER PUBLICATIONS

Ebrahim, M., "3D laser scanners' techniques overview", Int J Sci Res 4, 10 (2015), pp. 323-331.
Agrawal, A. et al., "A theory of multi-layer flat refractive geometry", 2012 IEEE Conference on Computer Vision and Pattern Recognition, Jun. 16-21, 2012, IEEE, https://doi.org/10.1109/cvpr.2012.6248073, pp. 3346-3353.
Ault, J. et al., "Length-based assessment of sustainability benchmarks for coral reef fishes in Puerto Rico", Environmental Conservation 35, Sept. 3, 2008, https://doi.org/10.1017/s0376892908005043, 2008, pp. 221-231.
Buchsbaum, G., "A spatial processor model for object colour perception", Journal of the Franklin Institute 310, 1 (1980), 1-26. https://doi.org/10.1016/0016-0032(80)90058-7, 1980, pp. 1-26.
Caldwell, Z. et al., "Reef Fish Survey Techniques: Assessing the Potential for Standardizing Methodologies", PLOS ONE 11, 4 (Apr. 2016), https://doi.org/10.1371/journal.pone.0153066, 2016, pp. 1-14.
Cavedo, F. et al., "Steel Pipe Measurement System Based on Laser Rangefinder", IEEE Transactions on Instrumentation and Measurement 65, 6 (2016), https://doi.org/10.1109/TIM.2016.2514758, 2016, pp. 1472-1477.
Churnside, J. et al., "Fishery applications of optical technologies", ICES Cooperative Research Report No. 312, https://www.vliz.be/imisdocs/publications/ocrd/236653.pdf, 2012, 95 pages.
Cooke, S.J. et al., "Catch-and-release science and its application to conservation and management of recreational fisheries", Fisheries Management and Ecology 14, 2 (Apr. 2007), https://doi.org/10.1111/j.1365-2400.2007.00527.x, 2007, pp. 73-79.
Gaygusuz, O. et al., "Conversions of Total, Fork and Standard Length Measurements Based on 42 Marine and Freshwater Fish Species (from Turkish Waters)", 2006, Turkish Journal of Fisheries and Aquatic Sciences 6: pp. 79-84.
Goetze, J. et al., "A field and video analysis guide for diver operated stereo-video", Methods in Ecology and Evolution 10, 7 (2019), https://doi.org/10.1111/2041-210X.13189arXiv:https://besjournals.onlinelibrary.wiley.com/doi/pdf/10.1111/2041-210X.13189, pp. 1083-1090.
Hamilton, S. et al., "CCFRP Final Report", 2021, https://caseagrant.ucsd.edu/sites/default/files/CCFRP_Final_Report.pdf, 212 pages.
Harris, C. et al., "A combined corner and edge detector", Alvey vision conference, 1988, vol. 15. Citeseer, 10-5244, 6 pages.
Harvey, E. et al., "A comparison of the precision and accuracy of estimates of reef-fish length made by divers and a stereo-video system", 2001, Fisheries Bulletin 36 (Jan. 2001), pp. 38-49.
Heppell, S. et al., "Documenting recovery of a spawning aggregation through size frequency analysis from underwater laser calipers measurements", Biological Conservation 155 (Oct. 2012) https://doi.org/10.1016/j.biocon.2012.06.002, 2012, pp. 119-127.
Huntingford, F.A. et al., "Identifying individual common carp *Cyprinus carpio* using scale pattern", Journal of Fish Biology 83, 5 (Oct. 2013), https://doi.org/10.1111/jfb.12246, 2013, pp. 1453-1458.
Januchowski-Hartley, F. et al., "Fear of Fishers: Human Predation Explains Behavioral Changes in Coral Reef Fishes", PLoS ONE 6(8): e22761, https://doi.org/10.1371/journal.pone.0022761, Published Aug. 10, 2011, 9 pages.
Jaquet, N., "A Simple Photogrammetric Technique to Measure Sperm Whales at Sea", Marine Mammal Science 22, 4 (2006), 862-879. https://doi.org/10.1111/j.1748-7692.2006.00060.x arXiv:https://onlinelibrary.wiley.com/doi/pdf/10.1111/j.1748-7692.2006.00060.x, pp. 862-879.
Łuczyński, et al., "The Pinax-model for accurate and efficient refraction correction of underwater cameras in flat-pane housings", Ocean Engineering 133 (Mar. 2017), 9-22. https://doi.org/10.1016/j.oceaneng.2017.01.029.
Mallet, et al., "Underwater video techniques for observing coastal marine biodiversity: A review of sixty years of publications", (1952-2012). Fisheries Research 154 (2014), 44-62. https://doi.org/10.1016/j.fishres.2014.01.019.
Marchand, et al., "Pose Estimation for Augmented Reality: A Hands-On Survey", IEEE Transactions on Visualization and Computer Graphics 22, 12 (Dec. 2016), 2633-2651. https://doi.org/10.1109/TVCG.2015.2513408.
Mitsuru, et al., "New laser rangefinder for three-dimensional shape measurement of specular objects", Optical Engineering 40, 1 (2001), 53-60. https://doi.org/10.1117/1.1331269.
Monkman, et al., "Accurate estimation of fish length in single camera photogrammetry with a fiducial marker", ICES Journal of Marine Science 77, 6 (Mar. 2019), 2245-2254. https://doi.org/10.1093/icesjms/fsz030 arXiv:https://academic.oup.com/icesjms/articlepdf/77/6/2245/38496874/fsz030.pdf.
Mueller, et al., "Video and acoustic camera techniques for studying fish under ice: a review and comparison", Reviews in Fish Biology and Fisheries 16, 2 (Sep. 2006), 213-226. https://doi.org/10.1007/s11160-006-9011-0.
Nguyen et al., "A simple method for range finding via laser triangulation", Technical Document 2734 (1995), 13 pages.
Parthasarathy, et al., "Laser Rangefinder for Robot Control and Inspection", In Robot Vision, Azriel Rosenfeld (Ed.), vol. 0336. International Society for Optics and Photonics, SPIE, 2—11. https://doi.org/10.1117/12.933605, 1982.
Patrick, Bergeron, "Parallel Lasers for Remote Measurements of Morphological Traits", Journal of Wildlife Management 71, 1 (Feb. 2007), 289-292. https://doi.org/10.2193/2006-290.
Pet, et al., "Aggregations of *Plectropomus areolatus* and *Epinephelus fuscoguttatus* (groupers, Serranidae) in the Komodo National Park", Indonesia: Monitoring and Implications for Management. Environmental Biology of Fishes 74, 2 (Oct. 2005), 209-218. https://doi.org/10.1007/s10641-005-8528-8.
Pignatelli, et al., "Double cones are used for colour discrimination in the reef fish,*Rhinecanthus aculeatus*", Biology Letters 6, 4 (Feb. 2010), 537-539. https://doi.org/10.1098/rsbl.2009.1010.
Ramsay, et al., "Husbandry stress exacerbates mycobacterial infections in adult zebrafish, *Danio rerio* (Hamilton)", Journal of Fish Diseases 32, 11 (2009), 931-941.
Rankin, et al., "Delayed effects of captureinduced barotrauma on physical condition and behavioral competency of recompressed

(56) References Cited

OTHER PUBLICATIONS yelloweye rockfish, *Sebastes ruberrimus*", Fisheries Research 186 (Feb. 2017), 258-268. https://doi.org/10.1016/j.fishres.2016.09.004.
Rohner, et al., "How large is the world's largest fish? Measuring whale sharks *Rhincodon typus* with laser photogrammetry", Journal of Fish Biology 78, 1 (2011), 378-385. https://doi.org/10.1111/j.1095-8649.2010.02861.x arXiv:https://onlinelibrary.wiley.com/doi/pdf/10.1111/j.1095-8649.2010.02861.x.
Seagis, "Pricing of Popular Products", https://www.seagis.com.au/SeaGIS%20Prices.pdf, 2023, 3 pages.
Shafait, et al., "Towards automating underwater measurement of fish length: a comparison of semiautomatic and manual stereo-video measurements", ICES Journal of Marine Science 74, 6 (Feb. 2017), 1690-1701. https://doi.org/10.1093/icesjms/fsx007 arXiv:https://academic.oup.com/icesjms/articlepdf/74/6/1690/31246707/fsx007.pdf.
Sinovčić, et al., "Length-weight and length-length relationships for 10 pelagic fish species from the Adriatic Sea (Croatia)", Journal of Applied Ichthyology 20, 2 (2004), 156-158.
Stien, et al., "Consistent melanophore spot patterns allow long-term individual recognition of Atlantic salmon", Journal of Fish Biology 91, 6 (Nov. 2017), 1699-1712. https://doi.org/10.1111/jfb.13491.
Stock, et al., "Pulse recruitment and recovery of Cayman Islands Nassau Grouper (*Epinephelus striatus*) spawning aggregations revealed by in situ length-frequency data", ICES Journal of Marine Science 78, 1 (Jan. 2021), 277-292. https://doi.org/10.1093/icesjms/fsaa221.
Thomas, et al., "Using photogrammetry and color scoring to assess sexual dimorphism in wild western gorillas (*Gorilla gorilla*)", American Journal of Physical Anthropology 134, 3 (2007), 369-382. https://doi.org/10.1002/ajpa.20678arXiv:https://onlinelibrary.wiley.com/doi/pdf/10.1002/ajpa.20678.
Tueller, et al., "FishSense: Underwater RGBD Imaging for Fish Measurement", In Oceans 2021: San Diego—Porto. IEEE. https://doi.org/10.23919/oceans44145.2021.9705929, 5 pages.
Valerio, et al., ""Boo! Did we scare you?": behavioral responses of reef-associated fish, prawn gobies (*Amblyeleotris steinitzi* and *Amblyeleotris sungami*) to anthropogenic diver disturbance", Marine Biology 166, 1 (Nov. 2018). https://doi.org/10.1007/s00227-018-3447-3, 9 pages.

* cited by examiner

Close-up of the image sensor

Overall view

800A

1700

IMAGING SYSTEMS AND METHODS FOR DIMENSION MEASUREMENT INDEPENDENT OF LASER ALIGNMENT

CROSS-REFERENCE TO RELATED APPLICATIONS

This application claims priority to the provisional application with Ser. No. 63/575,598, titled "FISHSENSE: A 3D CAMERA SYSTEM FOR IN-SITU FISH MEASUREMENT IN AQUACULTURE AND MARINE PROTECTED AREAS," filed Apr. 5, 2024. The entire contents of the above noted provisional application are incorporated by reference as part of the disclosure of this document.

STATEMENT REGARDING FEDERALLY SPONSORED RESEARCH OR DEVELOPMENT

This invention was made with government support under 1852403 and 2244123 awarded by National Science Foundation. The government has certain rights in the invention.

TECHNICAL FIELD

The present technology relates to imaging, particularly to imaging systems and methods for estimating physical dimensions of underwater objects.

BACKGROUND

Scientists are interested in tracking the health of the fish species in the oceans, as it provides an indicator of the overall health of a marine ecosystem. Fish length may be used as an analog to monitor the health of a given species. It can provide information about the weight and age distributions of fish populations, and conclusions about the overall health of a population and ecosystem can be drawn.

SUMMARY

An aspect of the present document relates to a method of estimating a physical dimension of an object located underwater. In some embodiments, the method comprises: obtaining an image of the object captured underwater using an underwater imaging system comprising a camera and a laser source, wherein the image includes a representation of the object and a laser spot incident on the object; identifying, in the image, at least two points of interest on the object; determining an image-space distance between the at least two points as represented in the image; determining a location of the laser spot within the image; estimating a camera-to-object distance based on the location of the laser spot within the image and a calibrated spatial relationship between the camera and the laser source, wherein the calibrated spatial relationship is determined based on at least one calibration image captured underwater as part of a field calibration procedure; and estimating the physical dimension of the object based on the image-space distance using the camera-to-object distance.

Another aspect of the present document relates to a method of estimating a physical dimension of an object. In some embodiments, the method comprises: obtaining an image of the object, wherein the image includes a representation of the object and a laser spot; identifying at least two points of interest on the object in the image; determining a location of the laser spot within the image; estimating an object distance based on the location of the laser spot within the image and a spatial relationship between a camera and a laser source; and estimating the physical dimension of the object based on the at least two points of interest and the estimated object distance.

A further aspect of the present document relates to a method of estimating a physical dimension of an underwater object. In some embodiments, the method comprises: obtaining an underwater image that includes a representation of the object and a laser spot produced by a laser source; identifying, in the underwater image, at least two points of interest on the object; determining an image-space distance between the at least two points; determining a location of the laser spot within the underwater image; estimating a distance to the object based on the location of the laser spot and a calibrated spatial relationship between an imaging device and the laser source; and estimating the physical dimension of the object using the image-space distance and the estimated distance to the object.

A still further aspect of the present document relates to a method of estimating a physical dimension of an object. In some embodiments, the method comprises: obtaining an image of the object captured underwater using an imaging system comprising a camera and a laser source; identifying at least two points of interest on the object in the image; determining an image-space distance between the at least two points; determining a location of a laser spot produced by the laser source within the image; calculating a camera-to-object distance based on the location of the laser spot and a calibrated spatial relationship between the camera and the laser source, wherein the calibrated spatial relationship is determined without performing parallel alignment between multiple laser sources; and estimating the physical dimension of the object by converting the image-space distance using the calculated camera-to-object distance.

A still further aspect of the present document relates to a method of estimating physical dimensions of underwater objects. In some embodiments, the method comprises: performing a field calibration procedure including: capturing at least one calibration image of a reference object with known dimensions underwater using an imaging system comprising a camera and a laser source, identifying positions of reference marks on the reference object and a position of a calibration laser spot in the calibration image, and determining a calibrated spatial relationship between the camera and the laser source based on the identified positions.

A still further aspect of the present document relates to a system for capturing images underwater used to estimate a physical dimension of an object located underwater. In some embodiments, the system comprises: at least one processor; and memory with instructions stored thereon, wherein the instructions upon execution by the at least one processor, cause the at least one processor to perform operations including: obtaining an image of the object captured using a camera during an underwater deployment; identifying at least two points of interest on the object in the image; determining an image-space distance between the at least two points; determining a location of a laser spot within the image, wherein the laser spot incident on the object; estimating a camera-to-object distance based on the location of the laser spot within the image and a calibrated spatial relationship between the camera and the laser source, wherein the calibrated spatial relationship is determined based on at least one calibration image acquired during the underwater deployment; and estimating the physical dimension of the object based on the image-space distance using the calculated camera-to-object distance.

A still further aspect of the present document relates to a system for capturing images underwater used to estimate a physical dimension of an object, comprising: a waterproof camera configured to capture images during an underwater deployment; and a laser source mounted in a fixed position relative to the camera, the laser source configured to project a laser beam that produces a visible laser spot on the object in a field of view of the camera, wherein: the position of the laser spot within an image is used to determine a camera-to-object distance, and a calibrated spatial relationship between the laser source and the camera during underwater deployment enables conversion between image-space dimensions and physical dimensions using the determined camera-to-object distance.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

Figure 1:
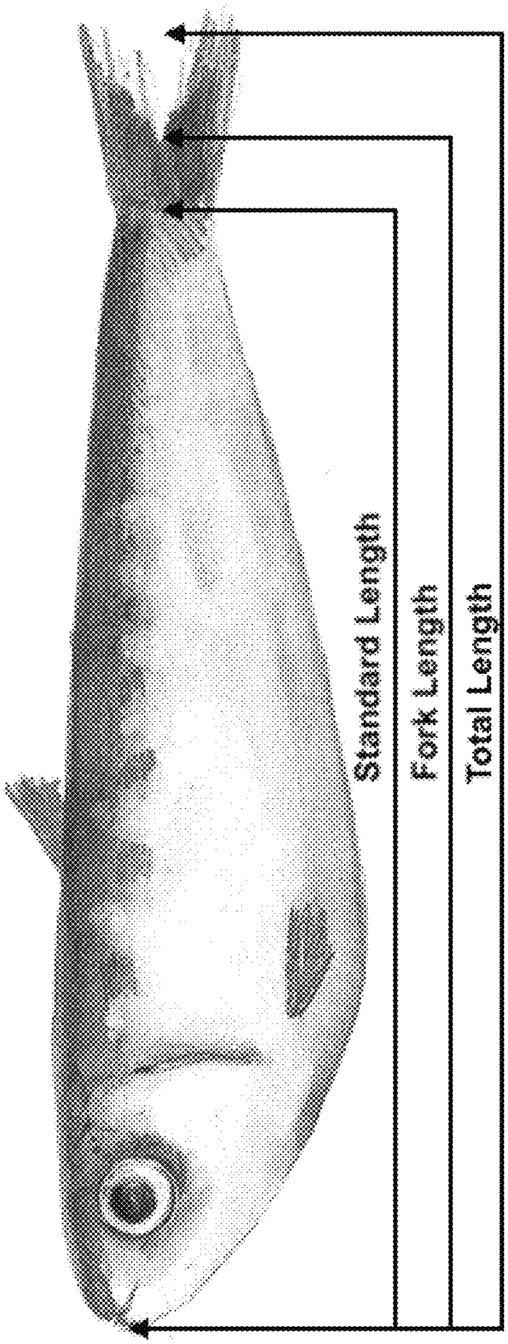
FIG. 1 is an illustration of fish length metrics.

The following description sets forth example aspects of the present disclosure. It should be recognized, however, that such description is not intended as a limitation on the scope of the present disclosure. Rather, the description also encompasses combinations and modifications to those example aspects described herein. In addition, section headings are used in the present document only to improve readability and do not limit scope of the disclosed embodiments and techniques in each section to only that section.

0. INITIAL REMARKS

Fish populations around the world are under threat. To successfully enact meaningful change, evaluating the health of fish populations is crucial. One way to achieve this is to collect data on fish length. The challenge is that current methods are expensive, difficult to maintain, or require regular and extensive training. This document describes a system, that reduces the cost of data collection and provides a user-friendly solution that may democratize the gathering of fish length data to citizen scientists. In some embodiments, it provides a low-cost, easy-to-maintain instrument setup, built around a commercial camera, a single laser, and a custom post-processing pipeline. The system can be built on top of pre-existing equipment that divers already own. Test results show that this system can achieve similar accuracy to current methods (<10% error), while providing the above noted benefits.

The solution described herein can be implemented in example embodiments that integrate minimalistic hardware with computational algorithms to address these and other challenges in underwater dimensional measurement. An example system disclosed herein implement a calibration-based approach with laser triangulation to estimate physical dimensions of submerged objects, such as fish. It includes a waterproof imaging device (camera) and at least one laser source rigidly affixed relative to the camera, such that the emitted laser spot is visible within the captured image frames. Image acquisition is performed non-invasively-without physical contact with the target object. Each image encodes both image-space geometry and depth information, the latter obtained from the laser spot's position via triangulation. For example, by localizing the laser spot within the image and applying a calibrated geometric transformation that characterizes the spatial relationship between the camera and laser source, the system computes the distance to the object. This range data, when combined with image-space measurements between features of interest, enables accurate calculation of physical dimensions from the visual data. Unlike conventional systems that require precise parallel alignment between multiple lasers, the disclosed embodiments accommodate flexible laser positioning through field calibration. The described configurations offer reduced component complexity, supports in situ calibration during deployment, and maintain measurement accuracy despite potential alignment changes—making it particularly suitable for low-cost, field-deployable applications in citizen science, marine biology, and underwater surveying.

The following description of the technology is provided with reference to fish. It is understood that this is for illustration purposes only and not intended to be limiting. The technology may be used to measure a relatively planar object.

1. INTRODUCTION

Scientists are interested in tracking the health of the fish species in the oceans, as it provides an important indicator of the overall health of a marine ecosystem. Fish length may be used as an analog to monitor the health of a given species. It can provide information about the weight and age distributions of fish populations, and conclusions about the overall health of a population and ecosystem can be drawn. Thus, retrieving fish length is desirable.

Fish length can refer to several metrics, including total length, standard length, and fork length, demonstrated in FIG. 1. Without loss of generality, "fish length" in disclosed herein generally refers to fork length, but it is understood that the disclosed embodiments can also be used to obtain other lengths by converting between lengths for different species.

Fish length data is often recorded through visual census methods, where trained divers identify the fish species and length. Divers can be trained to give sufficiently accurate length estimates, though they must be retrained if they do not practice these skills for approximately six months. To address this, it may be desired to introduce methods that take less training and provide greater accuracy.

Figure 2:
FIG. 2 illustrates a fish being measured on a board as part of the CCFRP catch and release program.

Catch and release is an alternative method to obtain length data. Catch and release requires less training than previously mentioned diver-estimated length methods as it can use volunteer anglers. This process can be cost-prohibitive to do at scale. For example, the California Collaborative Fisheries Research Program (CCFRP) recruits seventeen thousand volunteer anglers. It employs the crews of thirty-six ships, only going on to catch 262 fish per trip. This process is time-consuming, expensive, and hazardous to both the animals and researchers. The catch and release process first requires catching the fish targeted for length collection. Once the fish are on the boat, they are placed on a length board, as seen in FIG. 2. This measurement is collected and the fish are released back into the water. However, even brief exposure to air can lead to adverse effects. Some fish, such as Rockfish, may regurgitate their stomachs and livers as a result. As such, catch and release is undesired, since it is invasive, may result in the death of the fish species the project aims to preserve, and is exorbitantly resource intensive.

Since these previous length estimation methods are expensive, require specialized training, or sometimes both, data are hard to collect. The disclosed embodiments, among other features and benefits, aim to democratize data collection by leveraging citizen scientists. As such, solutions proposed herein may balance the interests of scientists and citizen scientist divers.

The disclosed technology is configured to improve a less invasive roving diver surveys where a team of divers surveys an area. These surveys produce an estimated error of up to 25%. Thus, the systems of the present technology may match or improve upon this. To track individual health, scientists need to be able to identify an individual fish. Thus, details such as color spots or scale patterns need be identified, some of which may be millimeter-scale. Finally, capturing images of a fish may be difficult if the operational range of the system is within its flight initiation distance (FID). Fish populations that experience heavy spearfishing pressure may have an FID of up to two meters. To disturb the animals as little as possible while allowing for sufficient detail, the disclosed technology aims for an effective range of at least 5 meters, while in some implementations, a range between 2 and 3 meters may be sufficient.

For a citizen scientist to leverage the system, it is desired that the system is relatively inexpensive. The system may integrate with existing underwater photography infrastructure. Any additional parts that need to be acquired may be either available to buy off the shelf or easily manufactured. In some implementations, custom components of the system are designed to be 3D printable. The disclosed systems are robust enough to go months without being used. A system that breaks or loses calibration too easily may contribute noise that need to be thrown out. The disclosed systems, however, can be used by recreational divers, and thus may need to operate without specialized training. Building a system within these constraints can help democratize fish length measurements, thus allowing citizen science divers worldwide to contribute high-quality data, and regardless of the end-user, the disclosed systems are easy to implement and provide improved measurement results, as further disclosed herein.

To meet these and other goals, an example system may include a popular waterproof camera unit, with a laser pointer attached rigidly to a custom 3D printed laser mount. This technique provides better estimates than the human-estimated state of the art and can be done non-invasively.

1.1 Underwater Ranging

A common method for collecting fish length measurements uses stereo video technology. These are typically diver-operated (known as stereo diver-operated video or stereo-DOV) or placed in baited remote underwater video (BRUV) systems. While stereo-DOV is a more cost-effective solution than deploying a remote system, the current state of the art still requires purchasing proprietary hardware and software, which can be prohibitively expensive for a citizen scientist at a minimum of $4600 USD for a scientist grade stereo video system. In addition, stereo video generates a large amount of data that requires great effort to transport and process.

Commercial stereo video solutions include the AQ1 AM100 and the AKVA Vicass HD, typically used in aquaculture. Such systems are also costly and need a tether to a surface-side computer with proprietary software that is used to manage the system. This limits the regions of the world where the data can be collected as it needs scientists to interact with the system. The tether also limits the depths at which the data can be collected.

Another solution for length measurement uses laser calipers—two parallel lasers that are placed a known distance away from each other. When calibrated correctly, the known distance between the two laser spots can be used as a reference length to measure the entire fish. For these measurements to be accurate, both lasers need to be perfectly parallel with each other and the camera axis. Depending on manufacturing tolerances, such a requirement may mean that lasers need to be carefully selected. Typically, this system is calibrated by measuring the distance between the two laser spots at a large distance before a dive and need minute readjustments that may waste valuable deployment time. While there are extra costs incurred in both the value of two lasers and the time and effort needed to calibrate, length estimation becomes relatively straightforward. Lengths are then calculated by using the known distance between the two points and the projection of the fish onto the camera.

Single laser range finding also has precedence for use in animal size studies. The primary benefit of this approach is that it is more inexpensive than other solutions, and takes less training to operate. In some studies, a range finder are used as a completely separate module from a regular digital camera. Data from both modules need to be combined and processed manually to obtain lengths. This differs from the system disclosed herein, where length data is encoded directly into the image, and thus can be processed automatically. This process disclosed herein further reduces the training needed for citizen science divers since two devices need not be operated independently.

According to some embodiments, the technique used for range finding falls under a light projection-based triangulation rangefinder system, as it uses spatial information about the laser spot (or referred to as laser dot) to determine the depth of the subject. This method can be extremely accurate with the right combination of laser and image sensor—e.g., up to 10 micrometers. Such sensors have been experimented with as a cheap and simple solutions for robot localization, quality assurance in manufacturing, and 3D scanning.

According to some embodiments of the present technology, the system, which can be referred to as FishSense Lite, contributes at least the following:

(1) An affordable, open-source, accessible hardware unit that is easy to use, and can be built by anyone worldwide.

(2) A calibration procedure which can be conveniently performed in the field without expensive equipment.

(3) A software pipeline that can obtain length measurements directly from captured images without other, outside data necessary.

A summary of exemplary underwater ranging methods can be seen in Table 1, including exemplary FishSense Lite.

TABLE 1

Comparison of exemplary underwater ranging techniques

| Technique | Minimum Estimated Cost (USD) | Accuracy (relative error) | Ease of Use | Range |
|---|---|---|---|---|
| Stereo Video | $4600 | 2.5% | Intermediate | 2-10 m |
| Laser Caliper | $600* | 12% | Intermediate | 2-5 m |
| Acoustic Methods | $20k | 1.1%-35.2% | Hard | 1-16 m |
| Triangulation Rangefinding | $1200 (Table 2) | 8.8% (Section 5.2) | Easy | 2-5 m |

Regarding the Laser Caliper in Table 1, the listed cost refers to an above-ground system; the cost for underwater system is estimated to be slightly higher.

2 EXAMPLE IMAGING SYSTEM

2.1 Example Requirements

As presented in Section 1, the system may satisfy competing needs: those desired by scientists and those desired by citizen scientist divers.

According to some embodiments, the system includes the following specifications to provide scientifically valuable data:

(1) System may determine fish size with a maximum error of 25%.

(2) System may resolve millimeter-scale detail within our effective range.

(3) An effective range, e.g., a Maximum effective range, may be at or greater than 5 meters.

Additionally or alternatively, the system aims to democratize the collection of fisheries data via recreational divers (citizen scientists), which imposes additional needs:

(1) It may be inexpensive so that citizen scientists are encouraged to purchase it.

(2) The parts to build the system may be accessible and compatible with existing dive infrastructure.

(3) The parts may be available off-the-shelf or be 3D printable.

(4) The system may be robust.

(5) The final product may be usable with little specialized training.

(6) The system may be handheld and diver-operated.

Based on the analysis as exemplified in Section 1.1, the technology approaches the problem by building off equipment that many recreational divers already possess. In some embodiments, a waterproof laser rigidly is attached to an underwater camera. The technology uses laser triangulation to determine a range for the resulting laser spot and implement additional software to synthesize fish length data from these images alone. Next, the technology leverages this depth information to retrieve fish length by measuring the distance between the head and tail fork, assuming they are located at the same range as the laser spot.

2.2 Example Hardware

Figure 3:
FIG. 3 illustrates a fully assembled system according to some embodiments of the present disclosure.
Figure 4:
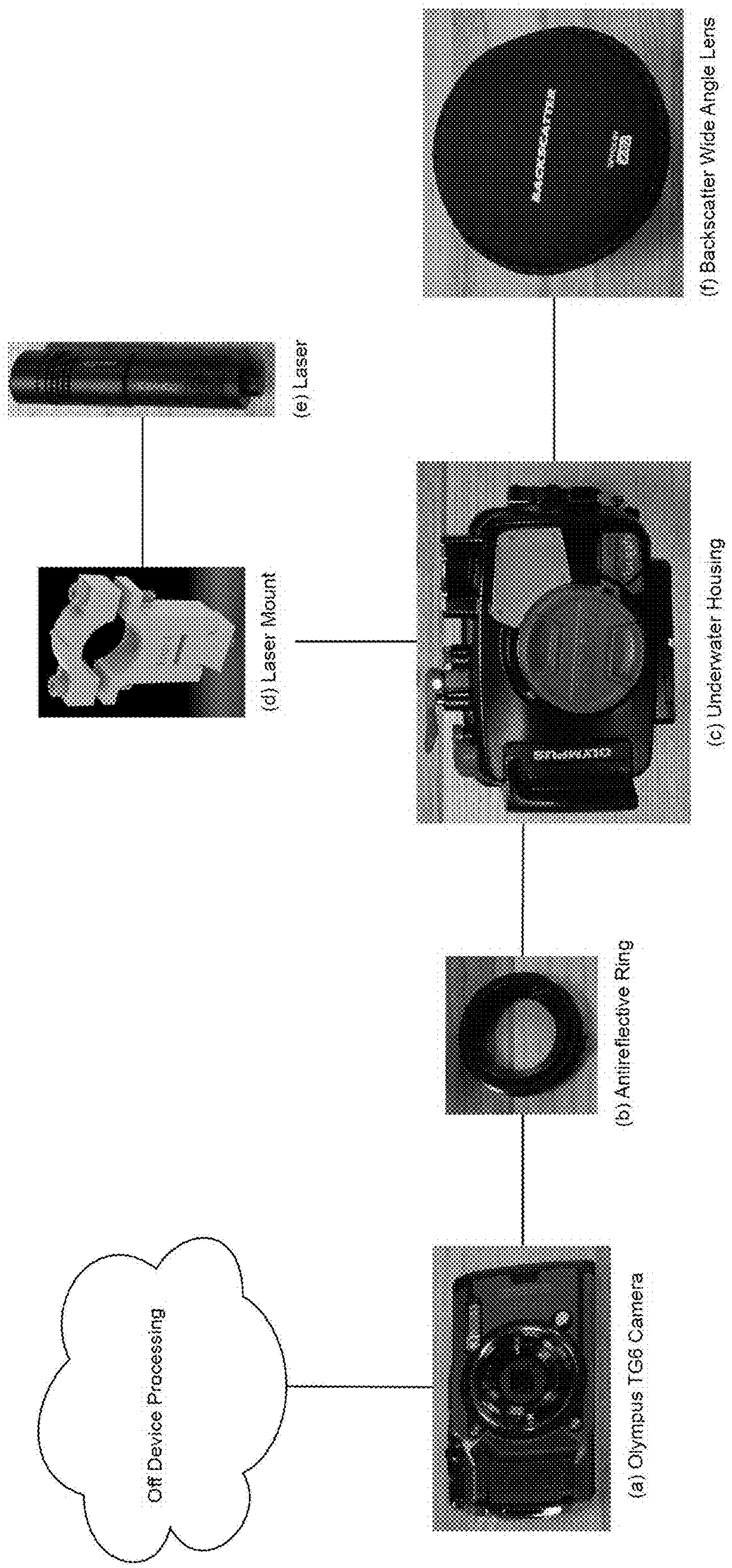
FIG. 4 illustrates hardware components of a system according to some embodiments of the present disclosure.

FIG. 3 shows an example of what an assembled imaging module looks like. FIG. 4 shows a system diagram containing components used in the system. The exemplary system includes: (a) Olympus TG6 camera, (b) lens ring, used to block out lighting artifacts inside camera housing, (d) 3D printed mount with screws, (c) waterproof housing, (e) waterproof laser, (f) Backscatter wide angle lens. Image date acquired by the Olympus TG6 camera may be processed by a processing device, e.g., an external device (illustrated as off device processing in FIG. 4). This exemplary system comes down to a cost of roughly $1200 USD. A cost breakdown is shown in Table 2.

TABLE 2

Cost breakdown of the exemplary system

| Item | Cost (USD) |
|---|---|
| Olympus TG6 | $499.99 |
| Waterproof Housing | $299.99 |
| Waterproof Laser | $70-$180 |
| Corrective optic | $179 |
| 3D Printed Mount | $2 |
| Total Cost | $1050.98-$1160.98 |

2.2.1 Camera and Housing. For illustrating purposes and not intended to be limiting, an exemplary system includes a camera, e.g., an Olympus TG6. Desirable features include that the camera is both relatively high resolution (12 megapixels), allowing for easy species identification, and because it is a relatively standard camera that many divers already own. The Olympus TG6 is rated to be waterproof up to 15 m, though its official housing may be included to protect it up to a depth of 45 m.

Figure 5:
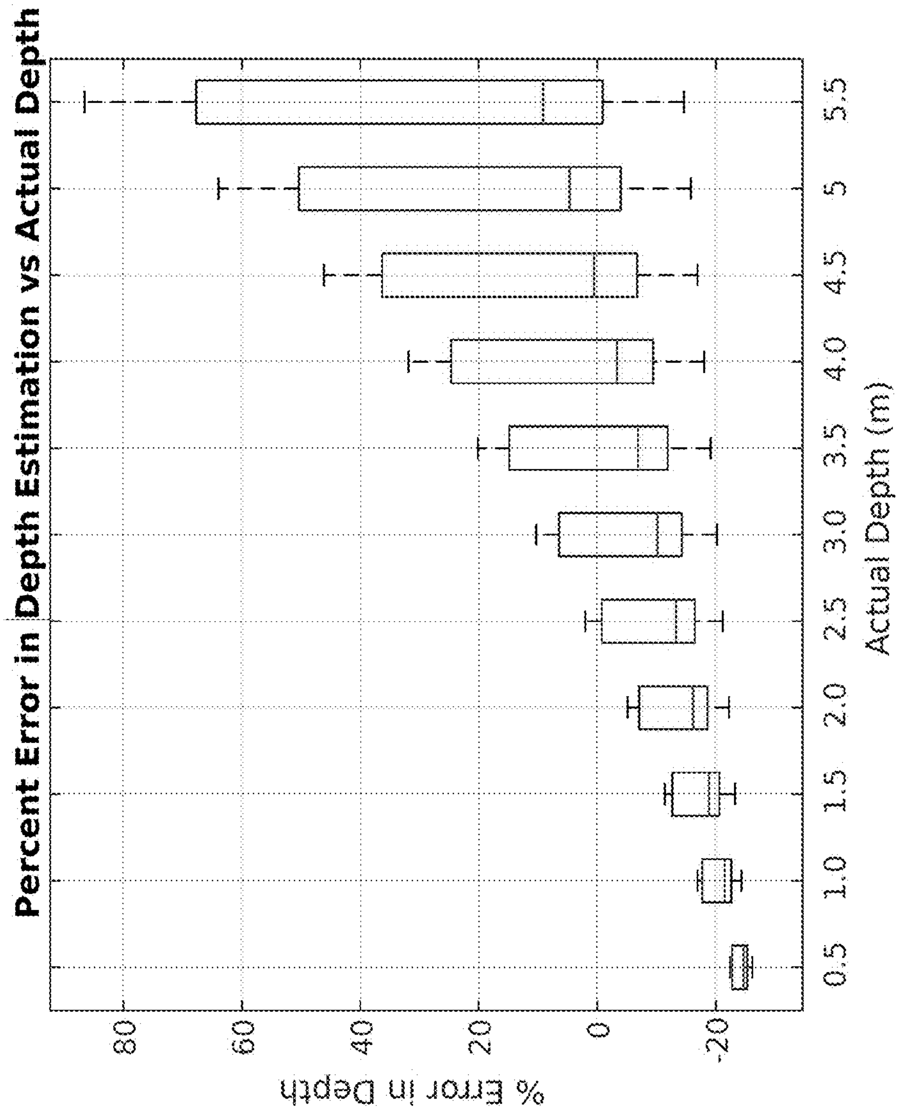
FIG. 5 shows percent depth error compared to actual depth as modeled by simulation according to some embodiments of the present disclosure.

2.2.2 Wide Angle Lens. To determine whether a lens is needed or beneficial, FIG. 5 shows modeled errors in calculated depth caused by flat port distortion with a generic camera. The distribution of the percent errors expands based on the distance from the object to the camera, suggesting that the model is nontrivial. The system may incorporate a corrective optic to address these errors and prevent them from propagating through to our length measurements.

For illustration purposes and not intended to be limiting, the system includes a Backscatter M52 81° Wide Angle Air Lens for this corrective optic. The corrective lens may compensate for the refractive effects of the air-plastic and plastic-water interfaces caused by the flat port of the camera housing. Distortion from Snell's law cannot be eliminated with just the standard camera model, the corrective optic may reduce or minimize the effect of this distortion. In some embodiments, the lens is omitted.

2.2.3 Laser. The system includes an underwater laser to the camera on the housing's built-in mounting cold shoe mount using a 3D-printed laser mount as presented in Section 2.2.4. Both lasers are rated as class IIIA (<5 milliwatts) to avoid the potential of divers damaging their eyes.

The color of the laser may affect: attenuation of light underwater, and how fish reacted to the laser. Two lasers were experimented: one green and one red. From the testing, the red laser was difficult to spot at a range of 4.4 m, while the green laser was still clearly visible at 21.5 meters. However, it was also noticed that fish tend to swim away from the green laser more than the red laser. This follows as biologists have confirmed that many fish species cannot see light waves with above a 600-650 nm wavelength. Since red light has a wavelength between 620 nm and 750 nm, it would be expected that fish cannot perceive red light.

2.2.4 Laser Mount. As part of the system defined in FIGS. 3 and 4, the system includes a 3D-printed laser mount that can be inserted into the camera (e.g., TG6), or the camera's waterproof housing's cold shoe mount without modifying the enclosure of the camera or the housing. For Olympus TG6, the laser mount includes three pieces. The main body has a center hole for a 30 mm long M4 screw to catch a nylon lock nut, press fitted into the bottom foot. This design ensures the laser sits flat on the cold shoe mount. Finally, the top portion of the mount is designed to put pressure on the laser to prevent it from spinning about its axis or transitioning in the Z direction. This portion also has a ridge along the top to match a mark on the body of the laser to ensure that rotation has not occurred.

For ease of manufacturing, the laser's axis may be kept approximately parallel to the camera's axis. Calibration further accounts for any deviation from this intention. To help meet the goals of providing a camera citizen scientists can build themselves, this mount is designed to be able to be printed on standard consumer 3D printers.

The current designs use an M4 thread tap to create threads in the wings of the mount's body. This helps to keep the cost down. One or more nylon lock nuts can be added to the screws on the wings to provide additional strength and reduce fragility. The designs for these components can be found on the project's GitHub.

2.3 Example Operating Assumptions

Given the system design, there are some assumptions that may be used in processing data:

2.3.1 Camera assumptions. The camera can be modeled with a pinhole model. This example camera model can simplify the process of relating image coordinates to spatial coordinates. Previous works on underwater camera calibration have demonstrated that the pinhole camera model breaks down due to refraction caused by the material separating the lens and water. The system circumvents this problem by using the corrective optic mentioned in 2.2.2, and employing a calibration procedure detailed in Section 3.1. In some embodiments, a Pinax model may be used. The Pinax model is a hybrid camera model that combines the pinhole camera model and a Snell's Law-based correction for underwater imaging.

2.3.2 Laser assumptions. In order to use the laser beam to measure distance, the laser's relationship to the camera need to be known with a high degree of accuracy. Measuring the position of the laser with respect to the camera lens may be insufficient. Small deviations in the laser mount may prevent the laser beam from being parallel to the camera axis, as well as small changes in the laser's position and orientation as the device is operated and transported. Thus, a calibration procedure may be implemented, which is detailed in Section 4.2.

2.3.3 Fish assumptions. The main operating principle of this system is that all depth on the object (e.g., a fish) is (substantially) at the same depth as the point the laser hits. Using this assumption, the points to be measured are all approximated to be at the same depth as the laser. The laser spot and the points of interest need to be visible within the image.

In addition, to improve or maximize accuracy, the object needs to be (substantially) perpendicular with respect to the camera's axis. This is because, in the system, the laser spot provides the only source of depth information in the image, so it is assumed that any other point in the image is also at that depth. A fish may be treated as (substantially) flat, which may bring in an error into the system, as the head and tail fork points are not at the same depth as the laser spot. However, the results presented in Section 5.2 demonstrate that despite this, the system may maintain 25% error or better.

2.4 Example Quantities of Interest

Figure 6B:
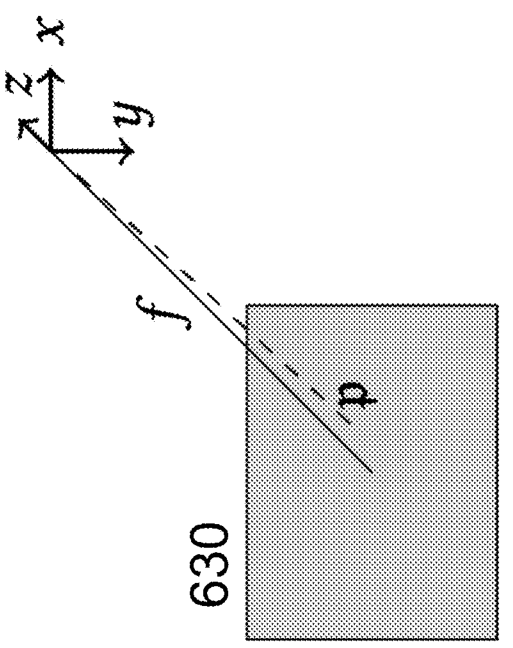
FIGS. 6A and 6B are diagrams illustrating quantities of interest according to some embodiments of the present disclosure.
Figure 6A:
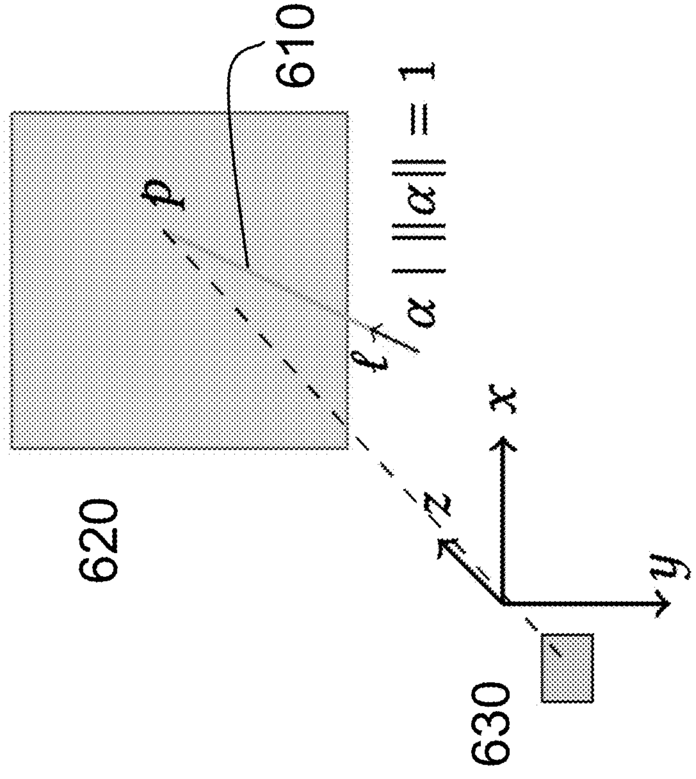

The camera's focal point is the origin of a reference frame. In addition, unless specified, all positions used are in optical coordinates, i.e., positive x is to the right of the camera, positive y is down, and positive z is away from the camera. Without loss of generality, all distances are measured in meters. The following quantities are defined, shown in FIGS. 6A and 6B. In FIGS. 6A and 6B, 610 illustrates a laser, 620 illustrates the fish plane, and 630 illustrates the image sensor.

- $\ell \in \mathbb{R}^3$: the location of the laser origin. To further constrain the problem, one can fix $\ell_z=0$.
- $\alpha \in \mathbb{R}^3$: a unit vector that determines the direction (or referred to as orientation) of the laser from the laser origin.
- $p \in \mathbb{R}^3$.: the 3D point at which the laser beam intersects the fish.
- $\mathfrak{p} \in \mathbb{R}^2$: the image coordinates of the laser in pixels, assuming the center of the image is (0,0).
- $f \in \mathbb{R}$ : the focal length of the camera (distance between the origin and the image sensor). This is more clearly shown in FIG. 6B.
- $w \in \mathbb{R}$ : the distance between the center of two pixels on the camera sensor, otherwise known as pixel pitch.

$\mathfrak{p}_p \in \mathbb{R}^2$: the principal point. This is the true "center" of the imager found using camera calibration.

$o \in \mathbb{R}^3$: the origin, which may be defined using the principal point.

Specifically, the origin may be located at $\mathfrak{p}_p+[0\ 0\ f]^T$.

2.5 Example Processing Pipeline

Figure 7:
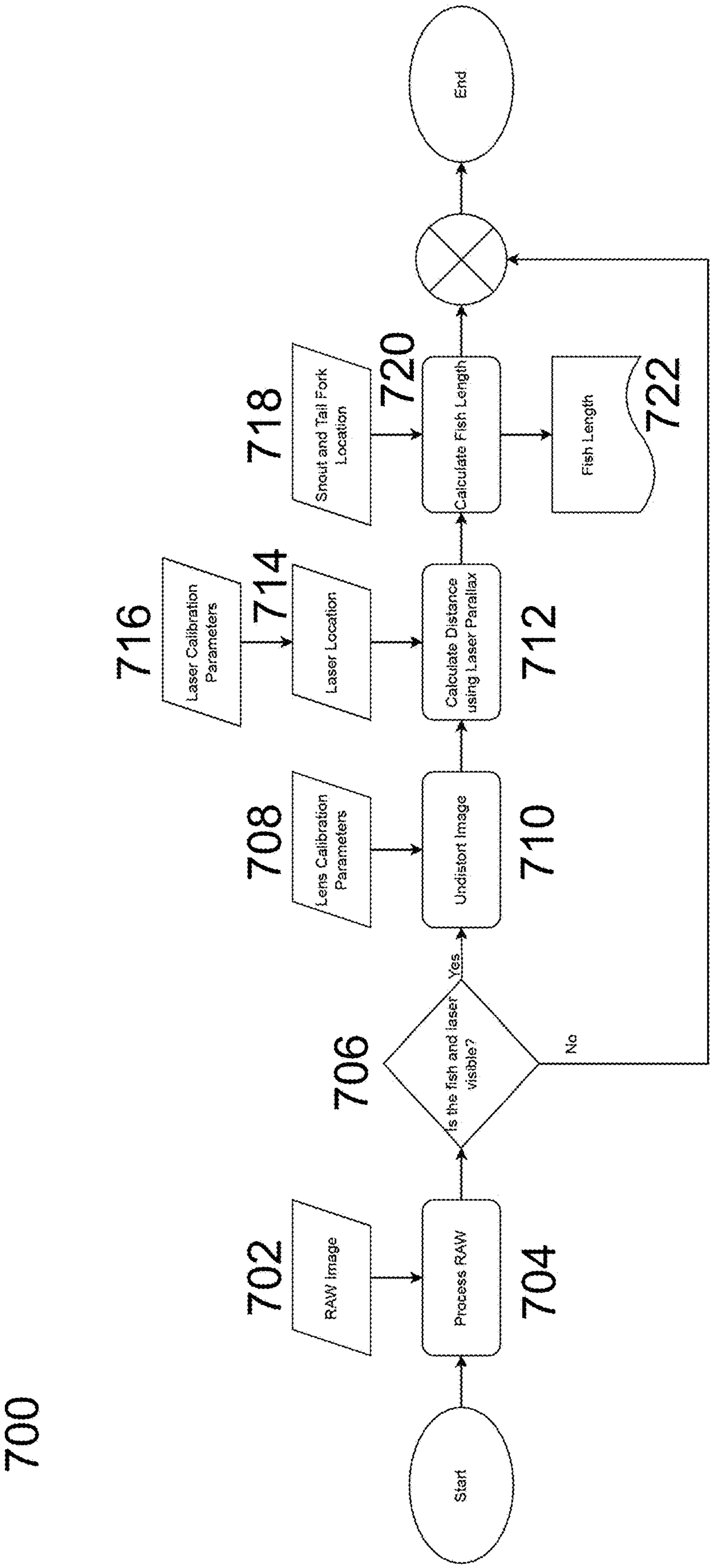
FIG. 7 illustrates a process in which a single image from the camera is transformed into a single length from a fish according to some embodiments of the present technology.

This system allows for easy data collection. The data may be post-processed to obtain fish lengths. FIG. 7 illustrates a process 700 in which a single image from the camera is transformed into a single length from a fish according to some embodiments of the present technology.

Operation 702 including taking the RAW Image from the Olympus TG6. Operation 704 includes processing the raw image. Operation 706 includes confirming, using the processed image, that a fish is within the frame and that the laser is on the fish. Operation 708 includes obtaining the lens calibration parameters calculated in Section 3.1. Operation 710 includes undistorting the image based on the lens calibration parameters. Operation 712 includes estimating a distance to the object the laser hits using the undistorted image as well as the laser location obtained at 714, and laser calibration parameters obtained at 716. It is assumed that all points within the image are at the same depth and project the fish onto a plane at this depth. Accordingly, the distance obtained at 712 is used to indicate the camera-to-object distance. Given the snout and tail fork obtained at 718, operation 720 includes calculating the fork length of the fish, and operation 722 includes returning it to the user.

2.5.1 Raw Processing. Cameras have internal image processing pipelines. This pipeline may be avoided since it is unclear how any individual pipeline works and Any distortion corrections may interfere with the calculations.

The system implements a software pipeline for processing raw image sensor information into color-corrected images. A debayering algorithm is applied to raw files, followed by a white-balancing algorithm. Manually selecting a true white value within the images, with which the color space may be re-scaled, increases labor costs.

The system uses the grey world assumption. This approach assumes that changes in the illuminant color can be modeled by scaling each channel by a constant factor and, therefore, proposes that a color constancy solution can be achieved that is independent of the illuminant color. To do this, each color channel may be divided by its respective mean value:

$$(\alpha R, \beta G, \gamma B) \rightarrow \left( \frac{\alpha R}{\frac{\alpha}{n}\sum_i R}, \frac{\beta G}{\frac{\beta}{n}\sum_i G}, \frac{\gamma B}{\frac{\gamma}{n}\sum_i B} \right)$$

This method allows automation of the color correction process and stretches out the color values which results in improved brightness and contrast. In some embodiments, the color correction to the image (distinct from the targeted color analysis used for laser spot identification described in element 1640 of process 1600 in FIG. 16) may be omitted.

3 EXAMPLE CALIBRATION PROCEDURES

3.1 Example Camera Calibration

A common procedure is followed to calibrate a standard camera model—a pinhole camera model with added lens distortion coefficients. Many (e.g., over 50) images of a checkerboard of known size may be captured to determine the camera's intrinsic matrix and lens distortion coefficients. This may be done underwater to take distortion from the refractive index of water into account. Notably, the intrinsic matrix contains the focal length f and principal point pp, which defines the camera's focal point.

Other images may be rectified using the retrieved intrinsic matrix and distortion coefficients. The pinhole camera model can then be used for all calculations of depth. In some embodiments, the camera calibration is part of the technical calibration performed before a field deployment.

3.2 Example Laser Calibration

To obtain an accurate estimate of a laser spot p in 3D space given the image dot $\mathfrak{p}$, the laser spot needs to be on a known planar object which image coordinate frame may be related to the camera's coordinate frame.

To get the planar object's pose, coordinates of known relationships within the image may be leveraged. The analysis includes drawing correspondences between the points on the object and the points in the image, finding a transformation between the two reduces to a Perspective from n Points (PnP) problem.

Let q be a point in this plane, n be the normal vector of the plane calculated by solving the PnP problem and recall that p is defined as the location of the laser spot. It is known that p−q is a vector that lies in the plane, and so $$n^T(p-q)=0. \tag{1}$$

Hence, $$n^T p = n^T q. \tag{2}$$

Using Equation 4 to get a unit vector u that points in the direction of the laser spot. For some scale factor μ, p=μu. μ may be determined using Equation 2:

$$\mu = \frac{n^T q}{n^T v}$$

The 3D location of the laser spot is calculated according to p=μu.

Like the previous step, this may be performed underwater to have the correct refractions. The following two methods may be used to find a plane.

3.2.1 Calibration with Checkerboard. The same checkerboard pattern mentioned in Section 3.1 may be used since it has distinct point features that can be relatively easily found and refined with sub-pixel accuracy.

It is assumed that the dimensions of the checkerboard pattern, in terms of the number of squares on each side and the size of each square, are known. Harris corner detection gives a way of calculating where each corner of the checkerboard is. Then using this the PnP problem presented above may be solved.

3.2.2 Field calibration. The above calibration procedure needs many pictures of a single checkerboard, which most people may not necessarily have access to. For calibration in the field, one can use a planar surface with identifiable features by placing duct tape with known width on a dive slate, e.g., in either an 'H' formation (e.g., FIG. 8A), a "cheveron" formation (e.g., FIG. 8B), or a Tic-Tac-Toe formation (e.g., FIG. 8C). This creates either eight (e.g., FIG. 8A), six (e.g., FIG. 8B), or sixteen (e.g., FIG. 8C), respectively, which can be used to estimate the pose of the dive slate, using a similar procedure to the checkerboard.

Figure 14:
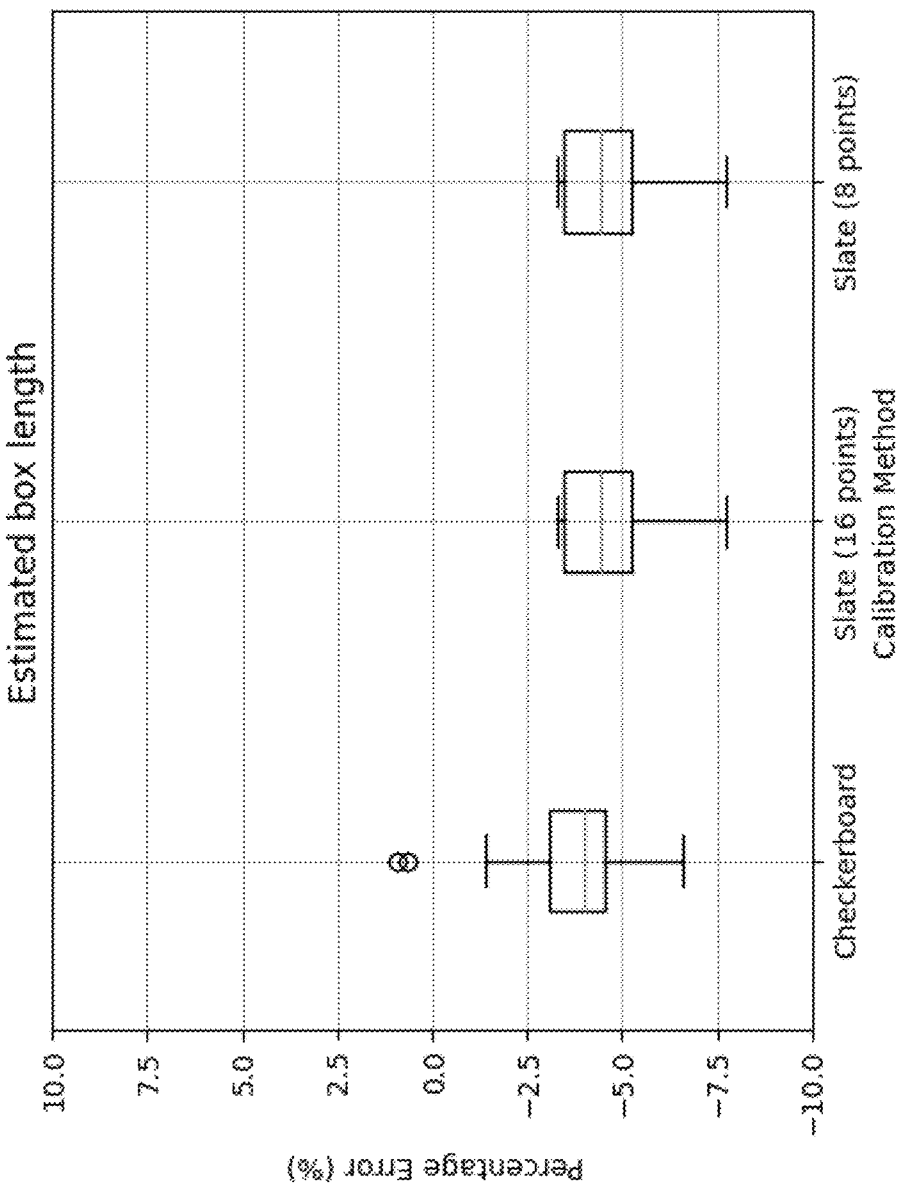
FIG. 14 illustrates length estimate of the box from different laser calibration methods according to some embodiments of the present technology.

A comparison between the two methods is shown in FIG. 14. Once points from each calibration image are found, one can estimate the laser parameters α and $\ell$ using the arithmetic in Section 4.2. $\ell$

4 EXAMPLE LASER TRIANGULATION

4.1 Example Distance Determination

Here, it is assumed that α (a unit vector that determines the direction of the laser from the laser origin) and $\ell$ (the location of the laser origin) are known, and the 3D laser spot location p (e.g., as illustrated in FIG. 6A). Starting with an image of the laser spot, the image coordinate of the laser spot p is known, so one can calculate the vector representing the location the laser spot lands on the image sensor, denoted by $p_s$:

$$p_s = \begin{pmatrix} -p_x w \\ -p_y w \\ -f \end{pmatrix}. \tag{3}$$

Then one flips this vector and normalize it to get $$v = -\frac{p_s}{\|p_s\|}. \tag{4}$$

Here, u points toward the laser spot as observed by the camera. Recall that the laser beam follows a ray $\overrightarrow{\ell p}$, constrained by the laser's departing point $\ell$ and direction α. Since the laser spot is projected by the beam and perceived by the camera, one knows that these rays intersect at p. This gives $$\ell + \lambda_1 \alpha = \lambda_2 v = p, \tag{5}$$

where $\lambda_1$ and $\lambda_2$ are unknown scale factors. One can refactor Equation 5 into the following form:

$$\begin{bmatrix} \alpha_x & -v_x \\ \alpha_y & -v_y \\ \alpha_z & -v_z \end{bmatrix} \begin{bmatrix} \lambda_1 \\ \lambda_2 \end{bmatrix} = \begin{bmatrix} -\ell_x \\ -\ell_y \\ 0 \end{bmatrix}. \tag{6}$$

Because u is quantized by pixel numbers, a scenario where $\ell + \lambda_1 \alpha = \lambda_2 u$ may be impossible, though one can still find a linear least squares solution that minimizes the difference.

Define the following quantities:

$$A = \begin{bmatrix} \alpha_x & -v_x \\ \alpha_y & -v_y \\ \alpha_z & -v_z \end{bmatrix} \tag{A1}$$

-continued $$\lambda = \begin{bmatrix} \lambda_1 \\ \lambda_2 \end{bmatrix}.$$

One makes the following observation $$A^T A \lambda = -A^T \ell. \tag{A2}$$

Simplifying both the LHS and RHS, one gets $$A^T A = \begin{bmatrix} \|\alpha\|_2^2 & -\alpha^T v \\ -\alpha^T v & \|v\|_2^2 \end{bmatrix}, \tag{A3}$$

$$-A^T \ell = \begin{bmatrix} -\alpha^T \ell \\ v^T \ell \end{bmatrix}. \tag{A4}$$

Equation A3 and Equation A4 can be combined to create an augmented matrix.

$$\left[\begin{array}{cc|c} \|\alpha\|_2^2 & -\alpha^T v & -\alpha^T \ell \\ -\alpha^T v & \|v\|_2^2 & v^T \ell \end{array}\right]. \tag{A5}$$

One can then row reduce Equation A5

$$\left[\begin{array}{cc|c} \|\alpha\|_2^2 & -\alpha^T v & -\alpha^T \ell \\ 0 & 1 & \left(-\alpha^T \ell + \dfrac{v^T \ell \|\alpha\|_2^2}{\alpha^T v}\right) \dfrac{1}{\left(\dfrac{\|v\|_2^2 \|\alpha\|_2^2}{\alpha^T v} - \alpha^T v\right)} \end{array}\right]. \tag{A6}$$

Using the results in Equation A6

$$\lambda_2 = \frac{-\alpha^T \ell \alpha^T v + v^T \ell \|\alpha\|_2^2}{\|v\|_2^2 \|\alpha\|_2^2 - \alpha^T v \alpha^T v}. \tag{A7}$$

Since α and u are both unit vectors, one observes that $$\|\alpha\|_2^2 = 1 \text{ and } \|v\|_2^2 = 1.$$

This simplifies Equation A7. The quantity of interest is A2, which has the closed-form solution:

$$\lambda_2 = \frac{-\alpha^T \ell \alpha^T v + v^T \ell}{1 - (\alpha^T v)^2}. \tag{7}$$

Once $\lambda_2$ is determined, the depth of interest is given by $\lambda_2 u_z$. When one wants to measure a fish length, one assumes the head and tail points are at the same depth as this laser spot. Defining $p_h$ and $p_t$ as the head and tail points of the fish, one uses Equations 3 and 4 to define two unit vectors $u_h$ and $u_t$. One can then define the 3D head and tail coordinates $p_h$ and $p_t$:

$$p_h = v_h \cdot \frac{\lambda_2 v_z}{v_{hz}}. \quad (8)$$

$$p_t = v_h \cdot \frac{\lambda_2 v_z}{v_{tz}}. \quad (9)$$

One now obtains the fish length L using the Euclidean distance:

$$L = \|p_h - p_t\|_2. \quad (10)$$

4.2 Example Estimating Laser Parameters

One assumes that α and $\ell$ are unknown, but one has n calibration images for which image i has a known laser spot point $p_i$ as obtained from Section 3.2. One can find α and $\ell$ that satisfies the following system:

$$p_1 = \|p_1 - \ell\|\alpha + \ell \quad (11)$$

$$p_2 = \|p_2 - \ell\|\alpha + \ell \quad (12)$$

$$\vdots$$

$$p_n = \|p_n - \ell\|\alpha + \ell \quad (13)$$

One observation about these equations is that they effectively constrain the norm of α to 1, since if the equality holds, one gets $$\alpha = \frac{p_i - \ell}{\|p_i - \ell\|}.$$

If the difference between the projected and real point is small, ||α|| is forced to be close to 1. To combine the equations defined in (Equation 13), the following stacked vectors are defined:

$$p = \begin{bmatrix} p_1 \\ p_2 \\ \vdots \\ p_n \end{bmatrix} \quad (14)$$

$$g(\alpha, \ell) = \begin{bmatrix} \|p_1 - \ell\|\alpha + \ell \\ \|p_2 - \ell\|\alpha + \ell \\ \vdots \\ \|p_n - \ell\|\alpha + \ell \end{bmatrix} \quad (15)$$

Note that g is a non-linear function of α and $\ell$, making linear-least squares solutions useless. The goal is to solve the following optimization problem:

$$\underset{\alpha,\ell}{\operatorname{argmax}} \|r(\alpha, \ell)\|_2^2, \quad (16)$$

$$r(\alpha, \ell) = p - g(\alpha, \ell). \quad (17)$$

Note that one only needs to solve for the x and y components of $\ell$ since $\ell_z$=0. (Equation 16) can be solved via iterative non-linear least square algorithms. The Gauss-Newton algorithm may be used. Defining $$x^{(k)} = \begin{bmatrix} \alpha^{(k)} \\ \ell_{xy}^{(k)} \end{bmatrix}, \quad (18)$$

where k is the iteration number of x and $$\ell_{xy}^{(k)} = \begin{bmatrix} \ell_x^{(k)} & \ell_y^{(k)} \end{bmatrix}^T,$$

one performs the following iterations:

$$x^{(k+1)} = x^{(k)} - (J_r^T J_r)^{-1} J_r^T r(\alpha, \ell), \quad (19)$$

where $J_r$ is the Jacobian of r with respect to $x^{(k)}$. Since r is of the form p−g(α,$\ell$), one can simplify this to be $$x^{(k+1)} = x^{(k)} + (J_g^T J_g)^{-1} J_g^T r(\alpha, \ell), \quad (20)$$

where $J_g$ is the Jacobian of g with respect to $x^{(k)}$. The derivation of $J_g$ is outlined in below:

Recall the function g(α,$\ell$):

$$g(\alpha, \ell) = \begin{bmatrix} \|p_1 - \ell\|\alpha + \ell \\ \|p_2 - \ell\|\alpha + \ell \\ \vdots \\ \|p_n - \ell\|\alpha + \ell \end{bmatrix}, \quad (B1)$$

where $p_i$ is the laser spot in optical coordinates from calibration image i.

One can split $J_g$ into two block columns representing the Jacobians with respect to different vectors:

$$J_g = [J_{g\alpha} \;\; J_{g\ell}]. \quad (B2)$$

Calculating $J_{g\alpha}$ is fairly trivial, as the function is linear in α:

$$J_{g\alpha} = \begin{bmatrix} \|p_1 - \ell\|I \\ \|p_2 - \ell\|I \\ \vdots \\ \|p_n - \ell\|I \end{bmatrix}. \quad (B3)$$

One can take the Jacobian with respect to $\ell$ by taking the Jacobians of each row individually. For a particular image i one has:

$$g_i(\alpha, \ell) = \|p_i - \ell\|\alpha + \ell \quad (B5)$$

$$\frac{\partial}{\partial \ell} g_i(\alpha, \ell) = -\frac{1}{\|p_i - \ell\|} \begin{bmatrix} (p_x - \ell_x)\alpha_x + 1 & (p_y - \ell_y)\alpha_x & (p_z - \ell_z)\alpha_x \\ (p_x - \ell_x)\alpha_y & (p_y - \ell_y)\alpha_y + 1 & (p_z - \ell_z)\alpha_y \\ p_x - \ell_x)\alpha_z & (p_y - \ell_y)\alpha_z & (p_z - \ell_z)\alpha_z + 1 \end{bmatrix}$$

-continued $$= I - \frac{1}{\|p_i - \ell\|}\alpha(p_i - \ell)^T.$$

Only the first two columns of this are needed, so one gets $$J_{g\ell}^j = \begin{bmatrix} I_{2\times 2} \\ 0 \end{bmatrix}\left(I_{3\times 3} - \frac{1}{\|p_i - \ell\|}\alpha(p_i - \ell)^T\right) \in \mathbb{R}^{3\times 2}. \quad \text{(B6)}$$

The results of the derivation of $J_g$ are given below:

$$J_g = \begin{bmatrix} J_{g\alpha}^1 & J_{g\ell}^1 \\ J_{g\alpha}^2 & J_{g\ell}^2 \\ \vdots & \vdots \\ J_{g\alpha}^n & J_{g\ell}^n \end{bmatrix} \in \mathbb{R}^{3n\times 5} \quad (21)$$

$$J_{g\alpha}^i = \|p_i - \ell\| I \in \mathbb{R}^{3\times 3} \quad (22)$$

$$J_{g\ell}^j = \begin{bmatrix} I_{2\times 2} \\ 0 \end{bmatrix}\left(I_{3\times 3} - \frac{1}{\|p_i - \ell\|}\alpha(p_i - \ell)^T\right) \in \mathbb{R}^{3\times 2} \quad (23)$$

Here unknowns are the x and y components of $\ell$ and all three components of α, totaling 5 unknowns. The above approach assumes that $$J_g^T J_g$$

is invertible. If one only has a single calibration image (n=1), $J_g$ is 3×5. It follows that $$J_g^T J_g$$

cannot be full rank, and is thus not invertible. Therefore, one needs at least 2 calibration images. In some example uses, multiple calibration images, e.g., around 50, may be obtained to allow one to reject images if needed.

The above approach also needs an initial guess for α and $\ell$, and for some cases, it is sufficient to start with rough measurements with a ruler for $\ell$, and assuming the laser is parallel with the camera axis ($\alpha^{(0)}=(0\ 0\ 1)^T$).

5 RESULTS

5.1 Example Reference Objects

To evaluate the laser camera system, many measurements of test objects were taken and compared to the actual lengths of the objects.

5.1.1 Reference Fish. One such object is a reference fish, shown in FIG. 9A. This reference fish is around 31 cm long (indicated by "L") and 8 cm wide at his widest point (indicated by "W"). Some experiments were conducted by placing the reference fish and the camera system in a swimming pool, taking pictures at varying distances with the laser spot on the reference fish, and evaluating the accuracy of measured length of the reference fish.

Figure 9B:
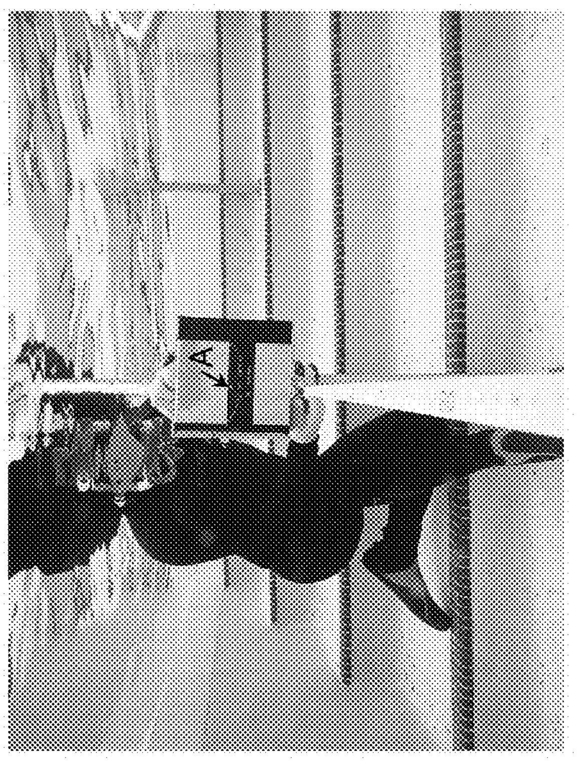
FIGS. 9A and 9B illustrate two reference objects according to some embodiments of the present technology.
Figure 9A:
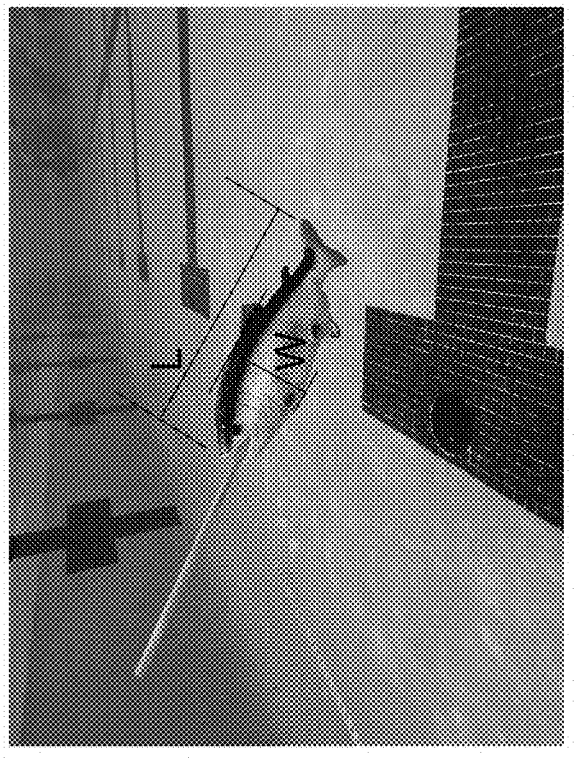

5.1.2 Box. A 15-cm segment of tape placed along the side of the box between two corners, as shown in FIG. 9B, was used to verify the results using an object with no thickness—i.e., the laser spot lies on the same plane as the "head" and "tail" points.

5.2 Example Length Measurements

Figure 10:
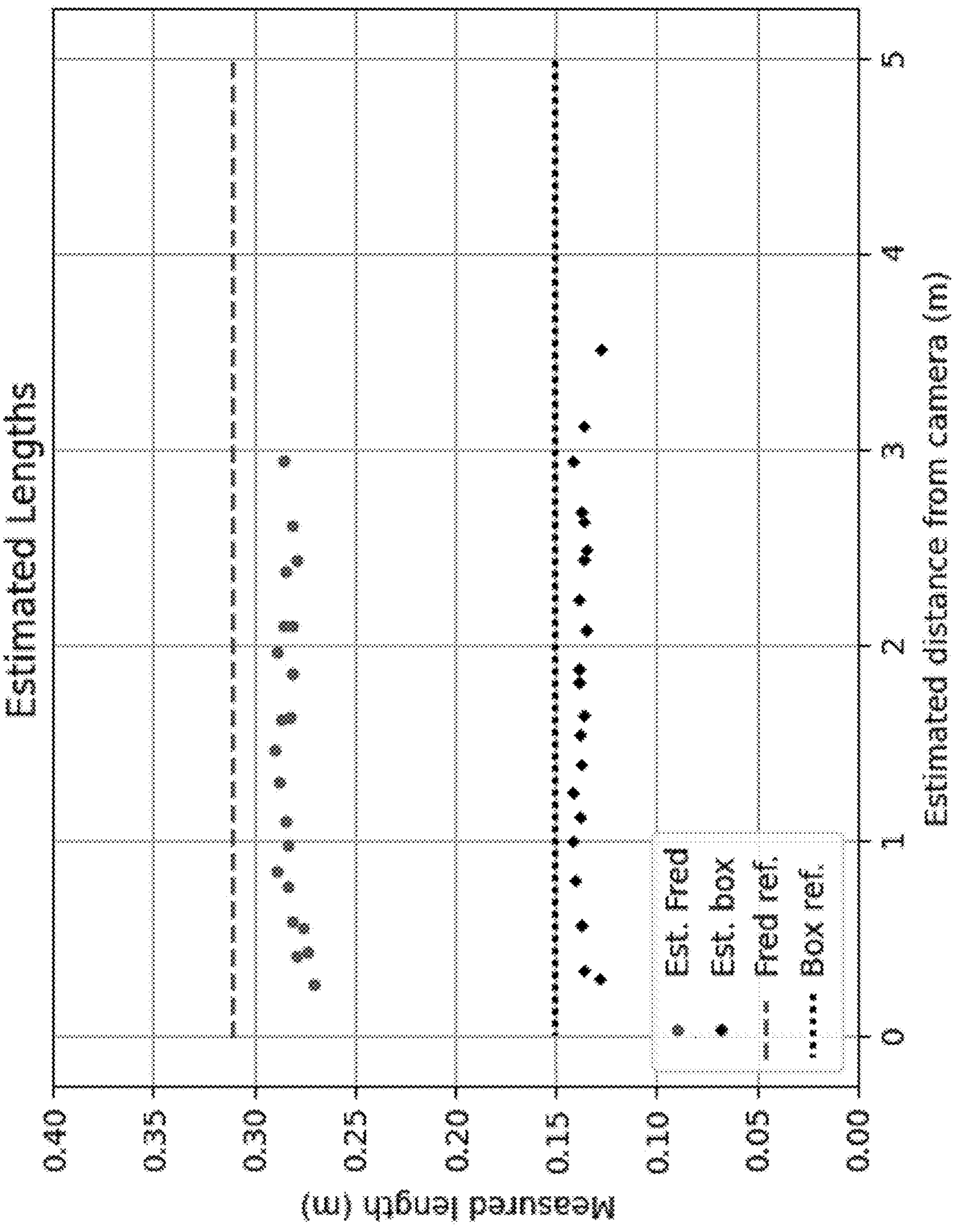
FIG. 10 illustrates results of length measurements of reference objects with a camera system according to some embodiments of the present technology.

This experiment was conducted by placing the reference fish and the box in a pool and capturing images of the reference fish with the laser projected onto it, first while increasing the distance until the laser was no longer visible, and then while decreasing the distance. All points of interest in the images, including the laser spot ("A"), snout tip, and tail fork points, were manually labeled. The ground truth distance from the camera to the laser spot may be measured, e.g., using direct physical measurement with a measuring tape, as illustrated in FIG. 9B. In the experimental results shown in FIG. 10, the laser triangulation procedure described in Section 4.1 was used to estimate this distance. As shown in FIG. 10, some deviation from the true object length is expected, as the object plane cannot be guaranteed to be perfectly perpendicular to the camera axis. This likely contributes to the consistent underestimation of measured lengths. The measurement error also appears generally consistent, except when the camera is positioned very close to the object, which may be due to the camera being angled above the object as a result of space constraints in the pool.

Figure 11:
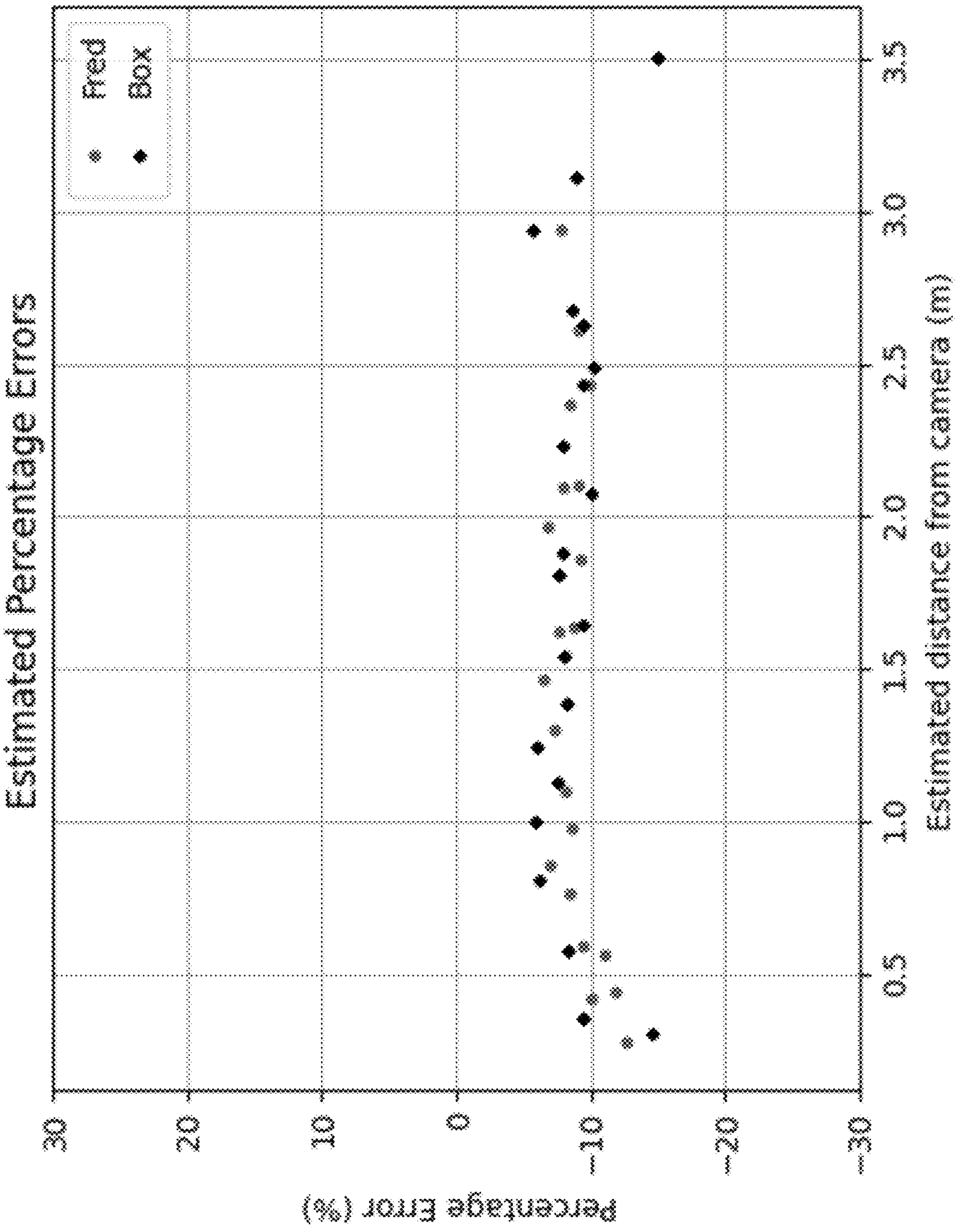
FIG. 11 illustrates percent errors in length measurements of reference objects with a camera system according to some embodiments of the present technology.

FIG. 11 shows the percentage errors from these tests. The results are notably similar, which is unexpected given the anticipated higher error in the measurements of the reference fish. It is suspected that additional error in the box measurements may result from misalignment, specifically the box not being perfectly perpendicular to the camera axis. Nonetheless, the average percentage error across these tests is 8.83%, which represents a substantial improvement over the initial target of 25%.

Figure 12:
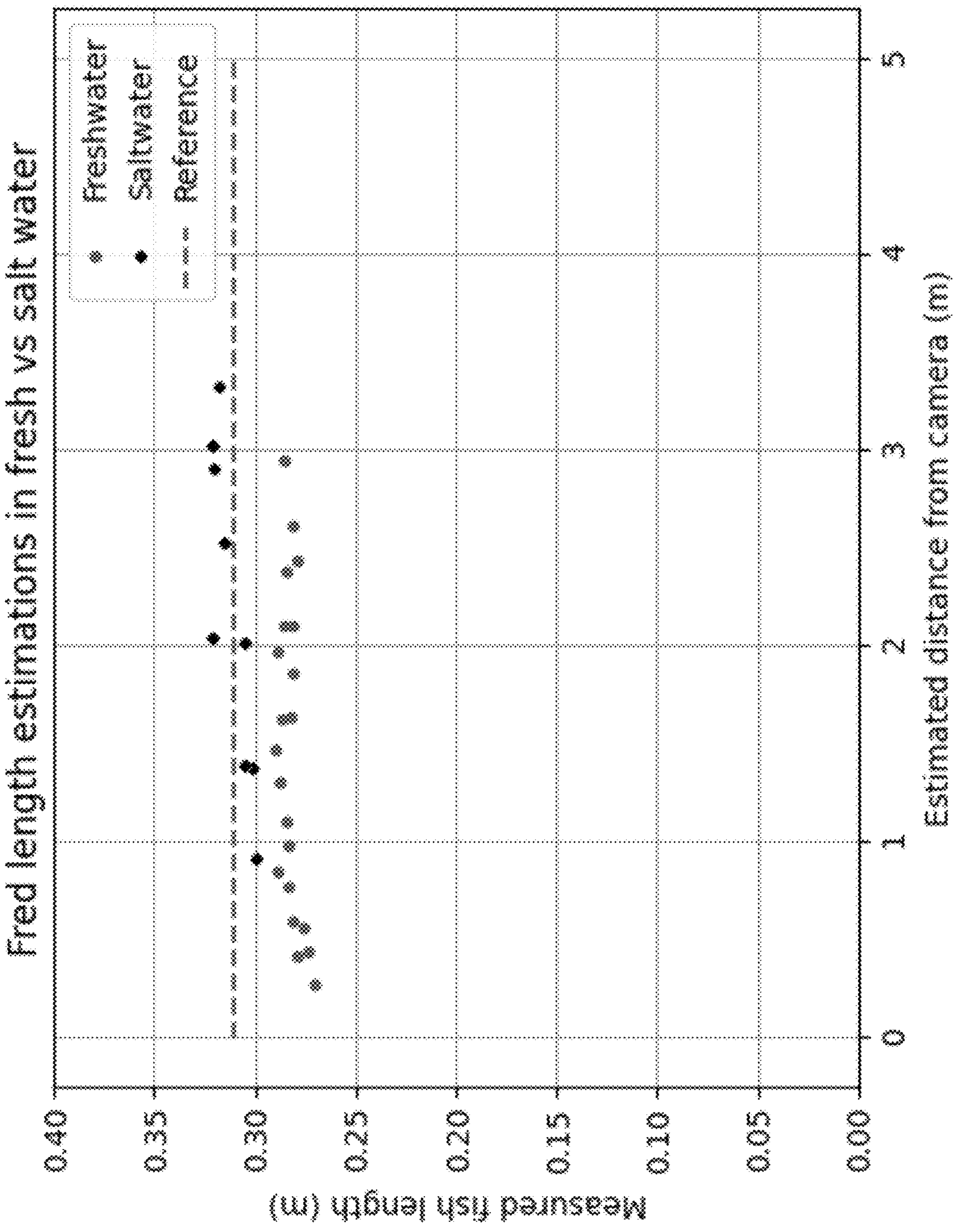
FIG. 12 illustrates length measurements of a fake fish used for reference in different salinities according to some embodiments of the present technology.

5.2.1 Different salinity levels. The system may be used with marine animals, any variation in length estimation caused by differences in salinity between the test pool environment and ocean water must be quantified. To assess this, measurements were taken during a dive off the Southern California coast, with images of the reference fish captured at varying distances at a depth of 40 feet of salt water (FSW), approximately 12 meters. As shown in FIG. 12, the change in environment significantly affects the length measurements, with estimated lengths increasing by approximately 10%. This may result primarily from the change in the refractive index of the water. Nevertheless, these estimates remain within the acceptable margin of error of 25%.

6 EXAMPLE FIELD TESTING

Current field testing of the example FishSense Lite system has been successful. User feedback indicates that the system is manageable for divers during underwater operation. Additionally, the system provides immediate visual confirmation that the target is within the frame, as the laser beams converge near the center of the image when the subject is within the specified distance range.

6.1 Southern California

To verify the robustness of the camera system under field conditions and to identify potential design improvements, several field tests were conducted with divers off the coast of Southern California. Initial evaluations focused on qualitative assessments of user experience with the camera unit and observations of changes in fish behavior. It was observed that the green laser, selected for its superior visibility, caused disturbance to marine life and frequently scared away fish. As a result, experimentation with a red laser was initiated.

In a subsequent test, a direct comparison was conducted between a unit equipped with a green laser and another with a red laser. Data collection was primarily performed at depths of 40 feet and 20 feet. The objective was to evaluate differences in usability and determine which laser configuration would be more suitable. Results indicated that the red laser had a noticeably lower impact on fish behavior compared to the green laser. However, at a depth of 20 feet, where water turbidity was reduced, the green laser also exhibited a diminished effect on fish behavior.

6.2 Florida Keys

Deployments conducted in collaboration with partners in the Florida Keys identified several design limitations. Repeated handling of the dive camera on and off boats introduced vibrations that caused screws to loosen and back out of their threaded holes. To address this issue, longer screws were implemented, and a new in-field recalibration procedure was developed. Additionally, it was observed that the plastic threading for the laser mounting eventually stripped, allowing the laser to shift. This was mitigated by adding lock nuts to secure the screws that hold the laser cap in place.

Field tests included teams of volunteer citizen scientists who used the camera systems during roving surveys. During these surveys, fish encountered were recorded, with the laser spot positioned as accurately as possible on the center of mass of each fish. Prior to each dive, an image of a dive slate with attached duct tape was captured to verify that system calibration remained intact.

Figure 8A:
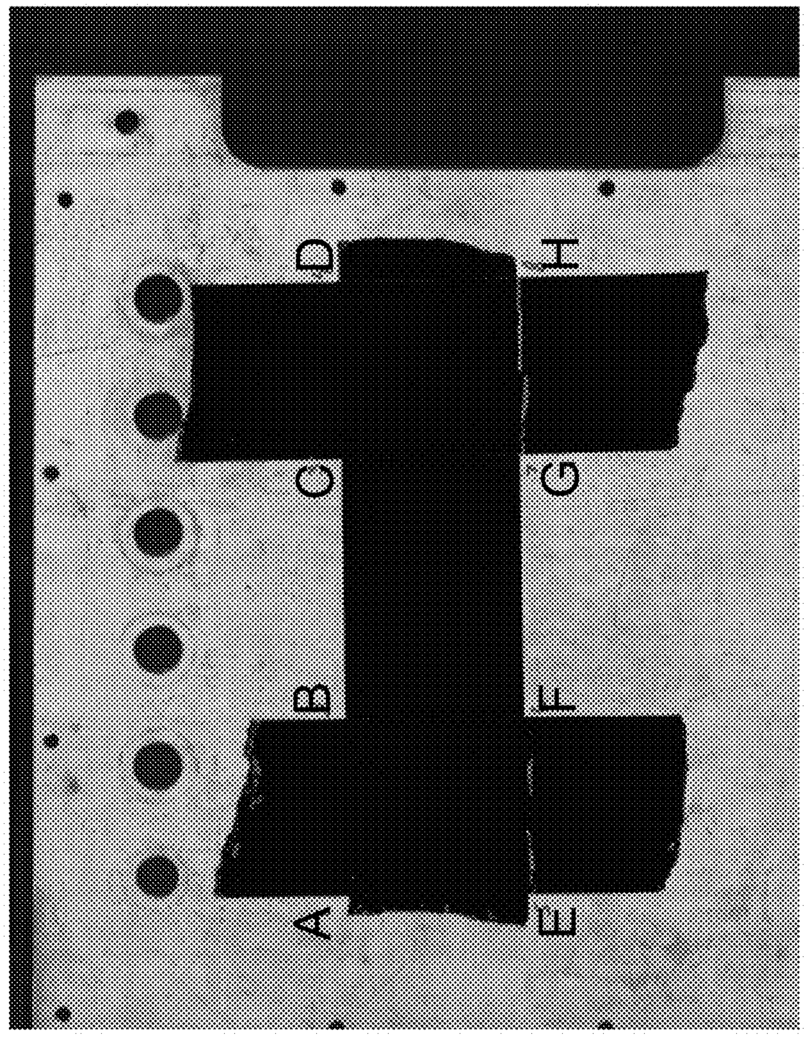
FIGS. 8A through 8C illustrate example calibration objects according to some embodiments of the present technology.
Figure 8B:
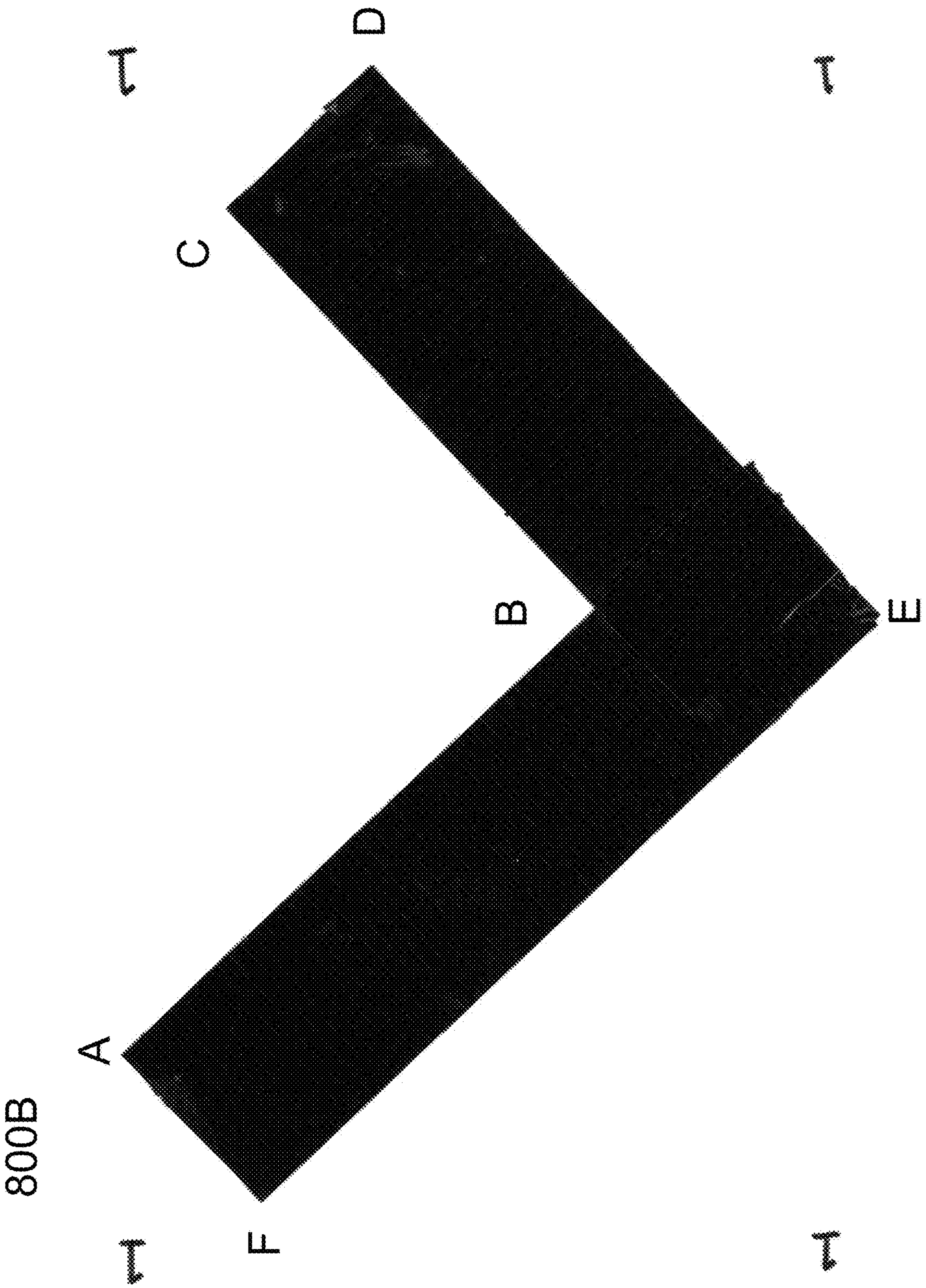
Figure 8C:
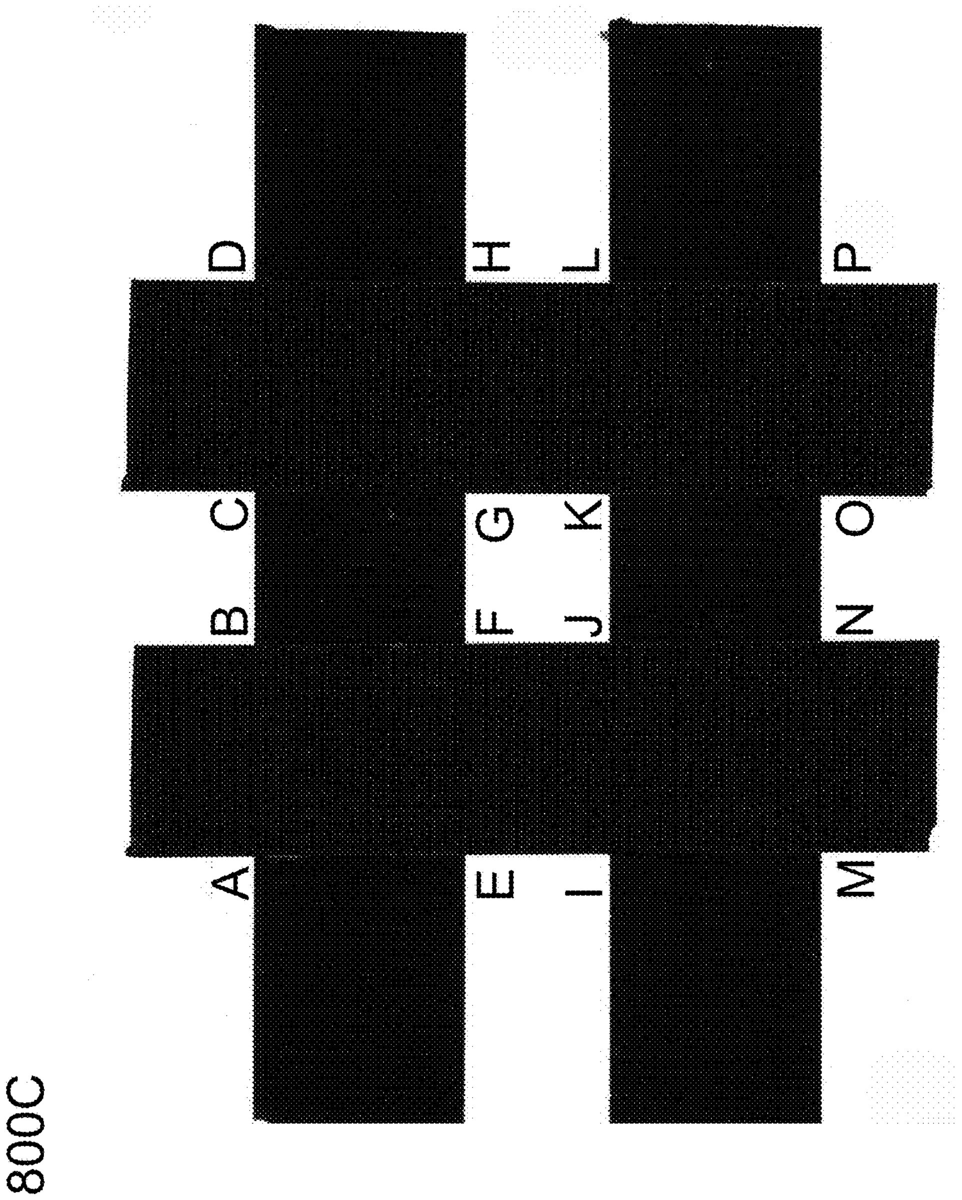

FIGS. 8A-8C show example calibration objects 800A, 800B, and 8000, respectively, suitable for field calibration of the underwater imaging system. The calibration object 800A may include a dive slate with black tape applied in an “H” pattern configuration. Eight points of interest are marked and labeled with letters A through H (or numbers 1 thorough 8) at the corners of the tape pattern. The calibration object 800B may include a dive slate with black tape applied in a “cheveron” pattern configuration. The calibration object 8000 may include a dive slate with black tape applied in a checkboard pattern configuration. Sixteen points of interest are marked and labeled with letters A through H (or numbers 1 thorough 16) at the corners of the tape pattern. Six points of interest are marked and labeled with letters A through F (or numbers 1 thorough 6) at the corners of the tape pattern. These and other example shapes allow the pose of the calibration board to be measured. These reference points with known relative positions (including known distances between any pair of feature points A-H in FIG. 8A, A-F in FIG. 8B, or A-P in FIG. 8C) are used during field calibration to determine the spatial relationship between the camera and laser. The labeled corners serve as identifiable features that allow the system to calculate the pose of the reference object relative to the camera. This field calibration method eliminates the need for precisely aligned parallel lasers by establishing the actual spatial relationship between the camera and laser during underwater deployment.

Figure 13:
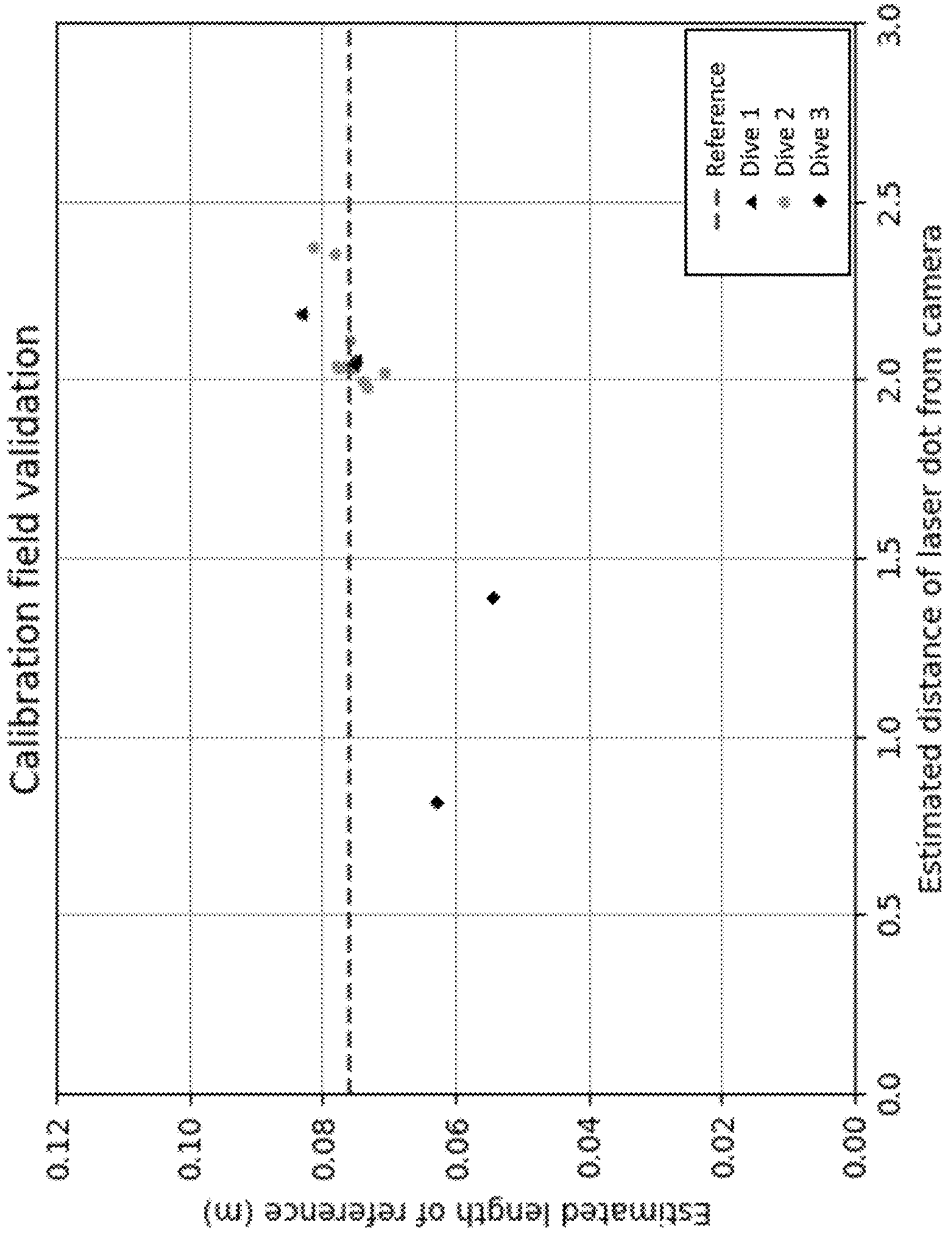
FIG. 13 illustrates validation of laser calibration by measuring a reference object according to some embodiments of the present technology.

During each dive, volunteers also captured multiple images of a reference object (e.g., the dive slate as illustrated in FIG. 8A through 8C) to assess whether calibration had drifted. This method confirmed that laser calibration may deviate from specification (see FIG. 13). As a result, a convenient field calibration procedure was developed. This procedure mirrors the standard calibration approach but replaces the checkerboard with a dive slate featuring clearly identifiable reference points, with known distances between all points, as illustrated in FIG. 9B. FIG. 14 presents measurements of the box obtained using different calibration methods and demonstrates that the field calibration procedure provides sufficiently accurate results.

Figure 15:
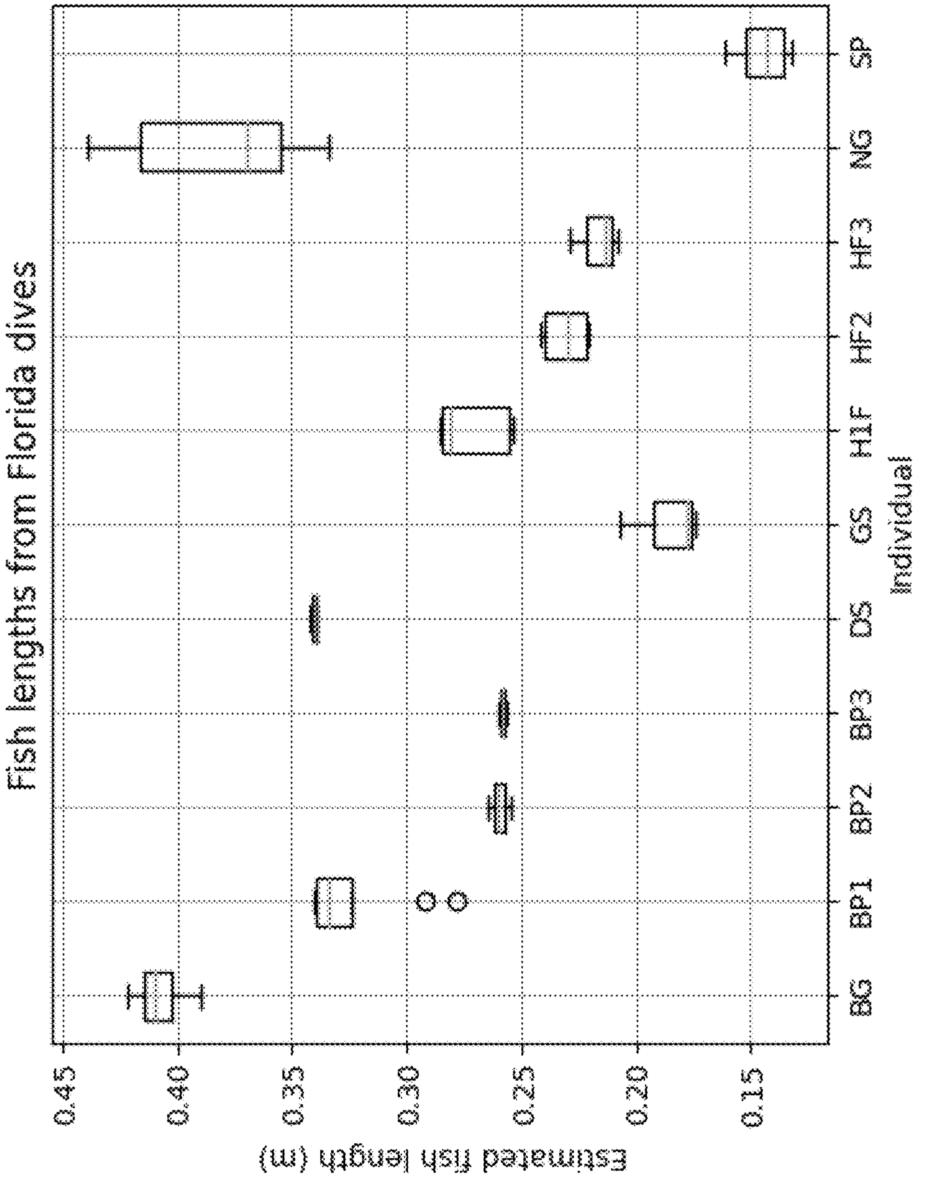
FIG. 15 illustrate measured lengths of individual fishes in the Florida Keys using a camera system according to some embodiments of the present technology.

FishSense Lite was also evaluated on live fish in open-water field conditions. Representative results from these tests are shown in FIG. 15. BG=Black Grouper, BP=Blue Parrotfish, DS=Dog Snapper, GS=Gray Snapper, HF=Hogfish, NG=Nassau Grouper, SP=Stoplight Parrotfish.

7 CONCLUSION

The results indicate that the proposed system provides improvements over existing fish length estimation techniques. It may be used as a non-invasive alternative to methods that are training-intensive or high in cost, such as diver-based visual estimation, as well as to techniques that may affect marine life, including catch-and-release practices.

The example system disclosed herein has been shown to estimate fish length within the target margin of error of 25%, and consistently achieves an average error of approximately 8.8%, which represents a notable improvement compared to conventional approaches.

In addition to improvements in underwater ranging, the system may be assembled using components already commonly available to many recreational divers, and the additional components may be obtained at relatively low cost. This configuration may provide a cost reduction of up to 75% compared to similar solutions and may need minimal user training. The system may be used to support broader participation in the collection of fish length data, thereby facilitating the development of larger datasets that may assist scientific efforts in monitoring and managing fish populations globally.

8. EXAMPLE EMBODIMENTS OF PROCESS AND SYSTEM

Figure 16:
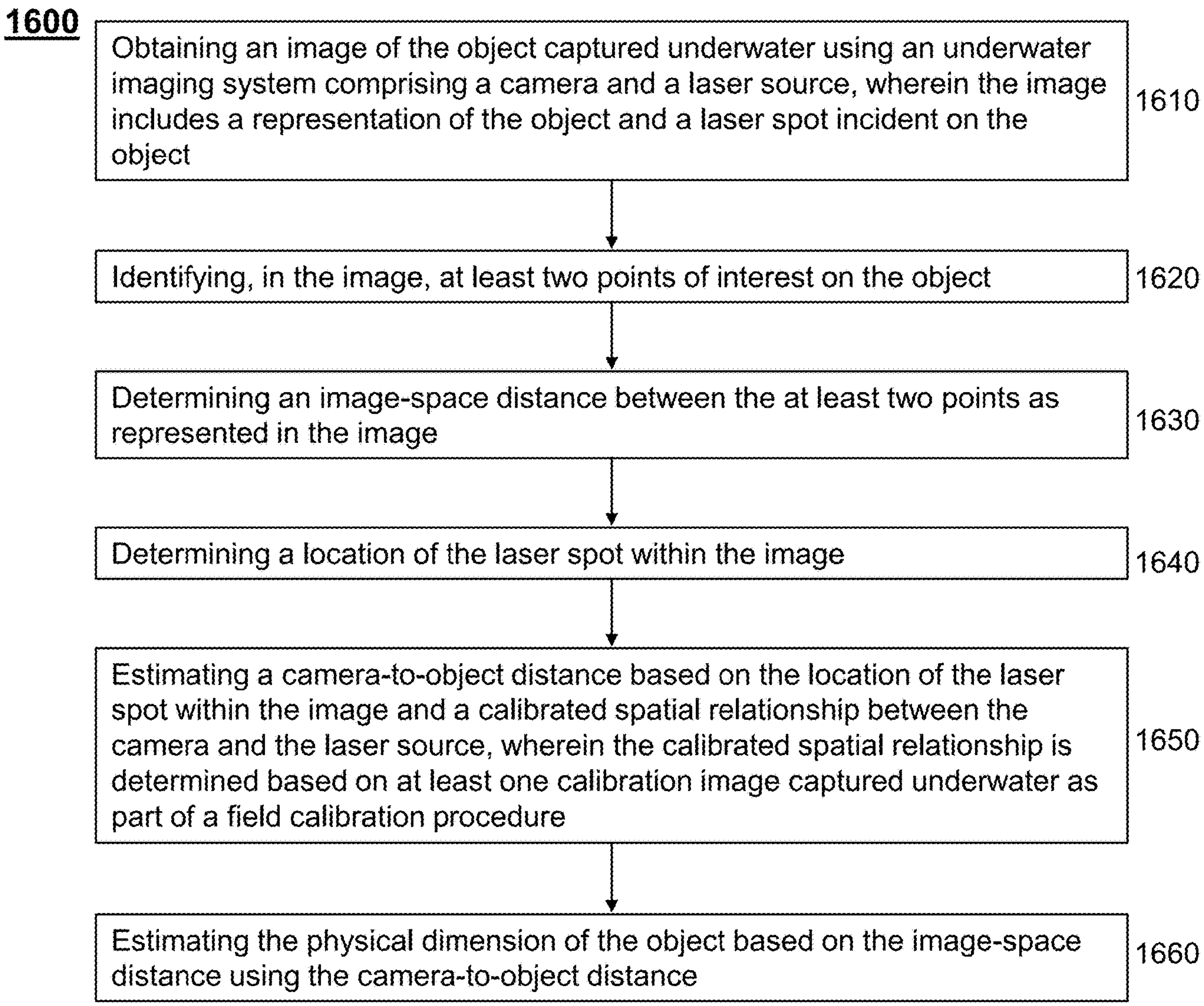
FIG. 16 is a flowchart illustrating a process of estimating a physical dimension of an object according to an embodiment of the present disclosure.

FIG. 16 is a flowchart illustrating a process 1600 of estimating a physical dimension of an object according to an embodiment of the present disclosure. Operation 1610 of process 1600 includes obtaining an image of the object captured underwater using an underwater imaging system comprising a camera and a laser source. The image includes a representation of the object and a laser spot produced by the laser source impinging on the object. In some embodiments, the process 1600 includes the underwater deployment during which the image and calibration images are acquired.

Operation 1620 of the process 1600 includes identifying, in the image, at least two points of interest on the object. This identification may utilize an artificial intelligence system to determine bounds of the object within the image, such as applying a segmentation model trained to distinguish between the object and background in underwater images. When the object is an aquatic animal (e.g., a fish), these points may comprise a snout point and a tail fork point defining a fork length of the fish, identified using the artificial intelligence system trained to recognize fish species and their morphological feature points in underwater images. Prior to this identification, the image may be processed to compensate for underwater visual effects including light backscatter and color attenuation, which may involve applying a debayering algorithm and performing white balancing by normalizing color channels.

Operation 1630 of the process 1600 includes determining an image-space distance between the at least two points as represented in the image, which provides the dimensional information in pixel space.

Operation 1640 of the process 1600 includes determining a location of the laser spot within the image. This location determination may be based on expected color characteristics of the laser spot and/or an expected shape of the laser spot in the image. The expected color characteristics of the laser spot may be determined based on wavelength-dependent light attenuation in water at different distances. For example, the expected color characteristics may be determined by obtaining a baseline color associated with the laser source and estimating color shifts from the baseline color based on wavelength-dependent light attenuation at different possible distances. The expected shape may be determined based on known characteristics of the laser source. The determination process may involve identifying candidate regions in the image and locating the laser spot by searching for the expected color characteristics or expected shape in these candidate regions.

In some embodiments, the image may include more than one laser spot, produced by one or more laser sources impinging on the object. Process 1600 may include determining a location of each of the laser spots within the image. This location determination may be based on expected color characteristics of each of the laser spots and/or an expected shape of the laser spot in the image.

Operation 1650 of the process 1600 includes estimating a camera-to-object distance from the camera to the object (or referred to as "depth information") based on the location of the laser spot within the image and the calibrated spatial relationship between the camera and the laser source. This calibrated spatial relationship is determined based on at least one calibration image captured underwater in a field calibration. The calibrated spatial relationship describes the three-dimensional position ($\ell$ in FIG. 6A) and orientation ($\alpha$ in FIG. 6A) of the laser source relative to the camera's optical center and imaging plane, including parameters that define the laser beam's trajectory in the camera's coordinate system.

In embodiments utilizing multiple laser spots, each laser spot can independently provide depth information based on its respective calibrated spatial relationship between the corresponding laser source and the camera, and these multiple depth measurements may be combined to improve measurement accuracy. Unlike conventional multi-laser systems that require precisely parallel alignment between lasers to establish a fixed reference distance, this approach calibrates each laser source independently relative to the camera. This eliminates the need for parallel alignment between multiple laser sources while still benefiting from the additional measurement points they provide. Each laser source has its own calibrated spatial relationship determined through the field calibration process, enabling the system to leverage multiple non-parallel laser sources for enhanced measurement precision.

The field calibration may involve determining a pose of the reference object relative to the camera based on identified reference marks and then determining the position and orientation of the laser source relative to the camera based on this pose and the position of the laser spot in the calibration image. The field calibration may be performed using one or more calibration images of a reference object with known dimensions. See, e.g., the exemplary calibration objects in FIGS. 8A-8C. The field calibration enables determination of a calibrated spatial relationship between the camera and the laser source. This calibration may involve identifying positions of the reference marks and the position of the laser spot in the calibration image, and determining the calibrated spatial relationship based on these identified positions and the known dimensions. The one or more calibration images of the field calibration may be acquired during the same underwater deployment as the object imaging. Additional description of the field calibration may be found at, e.g., section 3.2.2 and FIG. 13.

In some embodiments, the field calibration may build upon a technical calibration performed previously to determine camera intrinsic parameters such as focal length or principal point. Additional description of the technical calibration may be found at, e.g., sections 2.1, 3.1, 3.2.1, and 4.2 of the present disclosure.

Operation 1660 of the process 1600 includes estimating the physical dimension of the object by converting the image-space distance using the camera-to-object distance. This conversion translates the pixel-based measurements into real-world physical dimensions, enabling accurate estimation of the object's size.

Figure 17:
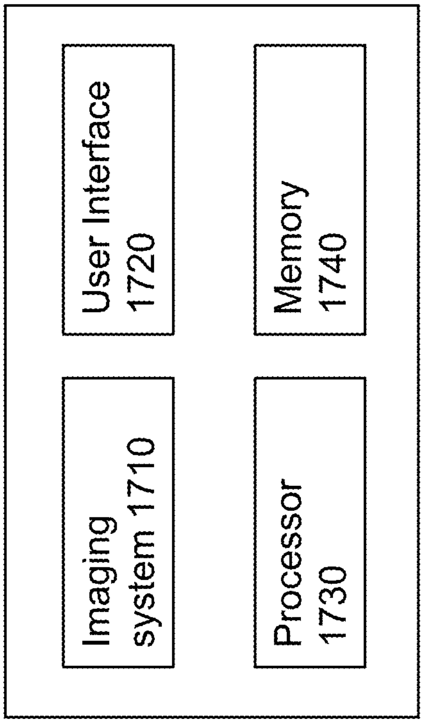
FIG. 17 illustrates a block diagram of a system for underwater dimensional measurement according to an embodiment of the present disclosure.

FIG. 17 illustrates a block diagram of a system 1700 for underwater dimensional measurement according to an embodiment of the present disclosure. The system includes an imaging system 1710, a user interface 1720, one or more processors 1730, and memory 1740. The imaging system 1710 encompasses the underwater camera and laser source components that capture images containing the object of interest and laser spot. The user interface 1720 provides means for user interaction with the system, allowing for control of image capture parameters, calibration procedures, and visualization of measurement results. The processor(s) 1730 executes the computational algorithms that perform image analysis, laser spot location, calibration processing, and dimensional calculations. The memory 1740 stores captured images, calibration data, object recognition models, and measurement results. Together, these components form an integrated system that enables the capture, processing, and analysis of underwater images to determine physical dimensions of objects without requiring precisely aligned parallel lasers.

While the system is well-suited for underwater applications such as measuring fish dimensions, the technology can extend well beyond marine environments. The calibration-based approach can be adapted for above-water measurements across various fields, including forestry (measuring tree diameters and heights), construction (determining dimensions of building elements or materials), archaeology (documenting artifact dimensions without physical contact), agriculture (assessing crop growth and fruit sizes), and industrial quality control (verifying component dimensions). The system can also be modified for microscopic applications by adapting the laser-camera relationship to smaller scales, enabling non-contact measurement of biological specimens or microelectronic components. In medical and veterinary contexts, it can provide non-invasive dimensional assessment of external features. Additionally, the technology can be integrated into drones or remotely operated vehicles to measure inaccessible structures such as bridges, wind turbines, or electrical towers. The technology-eliminating the need for parallel laser alignment through calibration-offers flexibility across these diverse applications, providing an alternative approach to dimensional measurement in situations where physical contact is impractical, unsafe, or potentially damaging to the measured object.

The technology offers several technical benefits directly stemming from its features. The elimination of strict parallel alignment requirements reduces manufacturing precision demands and associated costs, while enabling more robust operation in field conditions where equipment may experience minor impacts or vibrations. The field calibration capability allows the system to adapt to changing conditions and correct for alignment shifts without requiring recalibration in controlled environments. The single-laser approach reduces power consumption, simplifies hardware integration, and reduces or minimizes the complexity of optical path management compared to dual-laser or stereo systems. The computational approach to distance determination through laser spot positioning enables accurate measurements despite environmental optical challenges including light refraction, atmospheric distortion, variable lighting conditions, environmental particulates, and medium-dependent (e.g., water, air) attenuation effects that would otherwise distort traditional measurement methods.

Additionally or alternatively, the separation of hardware capture from computational processing allows for resource optimization, with computationally intensive tasks performed offline after image acquisition. The system's ability to operate without reference markers in the measurement image increases versatility across varying object sizes and distances.

The integration with machine learning for object segmentation and feature identification enables automated processing of large image datasets, improving throughput and consistency compared to manual measurement approaches.

The following examples are illustrative of several embodiments of the present technology:

Solution 1. A method of estimating a physical dimension of an object located underwater, comprising: obtaining an image of the object captured underwater using an underwater imaging system comprising a camera and a laser source, wherein the image includes a representation of the object and a laser spot incident on the object; identifying, in the image, at least two points of interest on the object; determining an image-space distance between the at least two points as represented in the image; determining a location of the laser spot within the image; estimating a camera-to-object distance based on the location of the laser spot within the image and a calibrated spatial relationship between the camera and the laser source, wherein the calibrated spatial relationship is determined based on at least one calibration image captured underwater as part of a field calibration procedure; and estimating the physical dimension of the object based on the image-space distance using the camera-to-object distance.

Solution 2. A method of estimating a physical dimension of an object, comprising: obtaining an image of the object, wherein the image includes a representation of the object and a laser spot; identifying at least two points of interest on the object in the image; determining a location of the laser spot within the image; estimating an object distance based on the location of the laser spot within the image and a spatial relationship between a camera and a laser source; and estimating the physical dimension of the object based on the at least two points of interest and the estimated object distance.

Solution 3. A method of estimating a physical dimension of an underwater object, comprising: obtaining an underwater image that includes a representation of the object and a laser spot produced by a laser source; identifying, in the underwater image, at least two points of interest on the object; determining an image-space distance between the at least two points; determining a location of the laser spot within the underwater image; estimating a distance to the object based on the location of the laser spot and a calibrated spatial relationship between an imaging device and the laser source; and estimating the physical dimension of the object using the image-space distance and the estimated distance to the object.

Solution 4. A method of estimating a physical dimension of an object, comprising: obtaining an image of the object captured underwater using an imaging system comprising a camera and a laser source; identifying at least two points of interest on the object in the image; determining an image-space distance between the at least two points; determining a location of a laser spot produced by the laser source within the image; calculating a camera-to-object distance based on the location of the laser spot and a calibrated spatial relationship between the camera and the laser source, wherein the calibrated spatial relationship is determined without performing parallel alignment between multiple laser sources; and estimating the physical dimension of the object by converting the image-space distance using the calculated camera-to-object distance.

Solution 5. A method of estimating physical dimensions of underwater objects, comprising: performing a field calibration procedure including: capturing at least one calibration image of a reference object with known dimensions underwater using an imaging system comprising a camera and a laser source, identifying positions of reference marks on the reference object and a position of a calibration laser spot in the calibration image, and determining a calibrated spatial relationship between the camera and the laser source based on the identified positions.

Solution 6. The method of any one or more solutions disclosed herein, wherein the field calibration procedure comprises: obtaining the at least one calibration image of a reference object captured underwater, the reference object including reference marks with known dimensions, the calibration image includes a representation of the reference object and a test laser spot produced by the laser source impinging on the reference object; identifying positions of the reference marks and a position of the test laser spot in the at least one calibration image; and determining the calibrated spatial relationship between the camera and the laser source based on the identified positions and the known dimensions.

Solution 7. The method of any one or more solutions disclosed herein, wherein the reference object comprises a planar item (e.g., dive slate) bearing the reference marks arranged in a predetermined geometric pattern.

Solution 8. The method of any one or more solutions disclosed herein, wherein determining the calibrated spatial relationship comprises: determining a pose of the reference object relative to the camera based on the identified positions of the reference marks; and determining a position and orientation of the laser source relative to the camera based on the pose of the reference object and the position of the test laser spot in the calibration image, wherein the calibrated spatial relationship comprises at least one of the determined position or orientation.

Solution 9. The method of any one or more solutions disclosed herein, wherein the calibration image is acquired during a same underwater deployment in which the image of the object is acquired.

Solution 10. The method of any one or more solutions disclosed herein, wherein determination of the calibrated spatial relationship is further based on a technical calibration performed prior to an underwater deployment in which the image of the object is acquired.

Solution 11. The method of any one or more solutions disclosed herein, wherein the technical calibration determines one or more camera intrinsic parameters including at least one of a focal length or a principal point.

Solution 12. The method of any one or more solutions disclosed herein, wherein identifying the at least two points of interest on the object comprises: using an artificial intelligence system to determine bounds of the object within the image; and selecting the at least two points for measurement within the determined bounds.

Solution 13. The method of any one or more solutions disclosed herein, wherein using the artificial intelligence system to determine bounds of the object comprises applying a segmentation model trained to distinguish between the object and background in underwater images.

Solution 14. The method of any one or more solutions disclosed herein, wherein: the at least two points of interest comprise feature points of the object along a measurement axis, and the method comprises: identifying the feature points within the object segmented by the segmentation model.

Solution 15. The method of any one or more solutions disclosed herein, wherein: the object is an underwater object; the artificial intelligence system is trained to identify at least one of a category of the underwater object or a structural feature or feature points of the at least one of the categories in underwater images. For example, the object is an aquatic animal; and the artificial intelligence system is trained to identify at least one of species of the aquatic animal or morphological features or features points of the at least one of the species in underwater images.

Solution 16. The method of any one or more solutions disclosed herein, comprising: processing, prior to identifying the at least two points of interest, the image to compensate for underwater visual effects including light backscatter and color attenuation.

Solution 17. The method of any one or more solutions disclosed herein, wherein processing the image comprises: applying a debayering algorithm; and performing white balancing by normalizing color channels.

Solution 18. The method of any one or more solutions disclosed herein, wherein determining the location of the laser spot within the image is determined based on at least one of: an expected color characteristic of the laser spot based on wavelength-dependent light attenuation in water at different distances; or an expected shape of the laser spot in the image.

Solution 19. The method of any one or more solutions disclosed herein, wherein determining the expected color characteristic comprises: obtaining a baseline color associated with the laser source; and estimating a color shift from the baseline color based on wavelength-dependent light attenuation in water at different possible distances.

Solution 20. The method of any one or more solutions disclosed herein, wherein determining the expected shape of the laser spot is performed based on known characteristics of the laser.

Solution 21. The method of any one or more solutions disclosed herein, wherein determining the location of the laser spot within the image comprises: identifying candidate regions in the image; and locating the laser spot by searching at least one of the expected color characteristic or expected shape in the candidate regions.

Solution 22. The method of any one or more solutions disclosed herein, wherein: the object is an aquatic animal (e.g., fish); and the at least two points comprise morphological points (e.g., a snout point and a tail fork point defining a fork length of the fish).

Solution 23. A system for capturing images underwater used to estimate a physical dimension of an object, comprising: at least one processor; and memory with instructions stored thereon, wherein the instructions upon execution by the at least one processor, cause the at least one processor to performing the method of any one or more solutions disclosed herein.

Solution 24. An underwater imaging system for capturing images underwater used to estimate a physical dimension of an object, comprising: a waterproof camera configured to capture underwater images; and a laser source securely mounted in a fixed position relative to the camera, the laser source configured to project a laser beam that produces at least one visible laser spot on the object in a field of view of the camera, wherein the position of the single laser spot within an image is used to determine a camera-to-object distance, and wherein a calibrated spatial relationship between the laser source and the camera during underwater deployment enables conversion between image-space dimensions and physical dimensions using the determined camera-to-object distance. In some embodiments, the system comprises at least one processor and memory storing instructions, wherein the instructions upon execution by the at least one processor, cause the at least one process to perform the method of one or more solutions disclosed herein.

Solution 25. An imaging system for capturing images used to estimate a physical dimension of an object, comprising: a camera configured to capture images, and a laser source mounted in a fixed position relative to the camera, the laser source configured to project a laser beam that produces at least one visible laser spot on the object in a field of view of the camera, wherein the position of the at least one laser spot within an image is used to determine a camera-to-object distance, and wherein a calibrated spatial relationship between the laser source and the camera during underwater deployment enables conversion between image-space dimensions and physical dimensions using the determined camera-to-object distance. In some embodiments, the system comprises at least one processor and memory storing instructions, wherein the instructions upon execution by the at least one processor, cause the at least one processor to performing the method of one or more solutions disclosed herein.

Solution 26. The system of any one or more solutions disclosed herein, comprising a mount configured to rigidly secure the laser source to the camera to maintain a calibrated spatial relationship between the laser source and the camera during.

Solution 27. The system of any one or more solutions disclosed herein, comprising a waterproof housing enclosing the camera, wherein the mount is attached to an exterior portion of the waterproof housing.

Solution 28. The system of any one or more solutions disclosed herein, comprising a wide-angle lens attached to the camera, wherein the wide-angle lens is configured to compensate for refractive effects caused by underwater imaging.

Solution 29. The system of any one or more solutions disclosed herein, wherein the laser source comprises a red laser or a green laser.

Solution 30. The system of any one or more solutions disclosed herein, comprising a reference object, wherein the reference object includes reference marks arranged in a predetermined pattern to enable field calibration of the spatial relationship between the laser source and the camera.

Solution 31. The system of any one or more solutions disclosed herein, wherein the reference object comprises a planar item (e.g., a dive slate) with the reference marks arranged in a predetermined geometric pattern.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of estimating a physical dimension of an object located underwater, comprising:

obtaining an image of the object captured underwater using an underwater imaging system comprising a camera and a laser source, wherein the image includes a representation of the object and a laser spot incident on the object;

identifying, in the image, at least two points of interest on the object;

determining an image-space distance between the at least two points as represented in the image;

determining a location of the laser spot within the image;

estimating a camera-to-object distance based on the location of the laser spot within the image and a calibrated spatial relationship between the camera and the laser source, wherein the calibrated spatial relationship is determined based on at least one calibration image captured underwater as part of a field calibration procedure; and estimating the physical dimension of the object based on the image-space distance using the camera-to-object distance.

2. The method of claim 1, wherein the field calibration procedure comprises:

obtaining the at least one calibration image of a reference object captured underwater, the reference object including reference marks with known dimensions, the calibration image includes a representation of the reference object and a test laser spot produced by the laser source impinging on the reference object;

identifying positions of the reference marks and a position of the test laser spot in the at least one calibration image; and determining the calibrated spatial relationship between the camera and the laser source based on the identified positions and the known dimensions.

3. The method of claim 2, wherein the reference object comprises a planar item bearing the reference marks arranged in a predetermined geometric pattern.

4. The method of claim 2, wherein determining the calibrated spatial relationship comprises:

determining a pose of the reference object relative to the camera based on the identified positions of the reference marks; and determining a position and orientation of the laser source relative to the camera based on the pose of the reference object and the position of the test laser spot in the calibration image, wherein the calibrated spatial relationship comprises at least one of the determined position or orientation.

5. The method of claim 1, wherein the calibration image is acquired during a same underwater deployment in which the image of the object is acquired.

6. The method of claim 1, wherein determination of the calibrated spatial relationship is further based on a technical calibration performed prior to an underwater deployment in which the image of the object is acquired.

7. The method of claim 6, wherein the technical calibration determines one or more camera intrinsic parameters including at least one of a focal length or a principal point.

8. The method of claim 1, wherein identifying the at least two points of interest on the object comprises:

using an artificial intelligence system to determine bounds of the object within the image; and selecting the at least two points for measurement within the determined bounds.

9. The method of claim 8, wherein using the artificial intelligence system to determine bounds of the object comprises applying a segmentation model trained to distinguish between the object and background in underwater images.

10. The method of claim 9, wherein:

the at least two points of interest comprise feature points of the object along a measurement axis, and the method comprises: identifying the feature points within the object segmented by the segmentation model.

11. The method of claim 9, wherein:

the object is an aquatic animal;

the artificial intelligence system is trained to identify at least one of species of the aquatic animal or morphological features or feature points of the at least one of the species in underwater images.

12. The method of claim 1, comprising:

processing, prior to identifying the at least two points of interest, the image to compensate for underwater visual effects including light backscatter and color attenuation.

13. The method of claim 12, wherein processing the image comprises:

applying a debayering algorithm; and performing white balancing by normalizing color channels.

14. The method of claim 1, wherein determining the location of the laser spot within the image is determined based on at least one of:

an expected color characteristic of the laser spot based on wavelength-dependent light attenuation in water at different distances; or an expected shape of the laser spot in the image.

15. The method of claim 14, wherein determining the expected color characteristic comprises:

obtaining a baseline color associated with the laser; and estimating a color shift from the baseline color based on wavelength-dependent light attenuation in water at the different distances.

16. The method of claim 14, wherein determining the expected shape of the laser spot is performed based on known characteristics of the laser.

17. The method of claim 14, wherein determining the location of the laser spot within the image comprises:

identifying candidate regions in the image; and locating the laser spot by searching at least one of the expected color characteristic or expected shape in the candidate regions.

18. The method of claim 1, wherein:

the object is a fish; and the at least two points comprise a snout point and a tail fork point defining a fork length of the fish.

19. A system for capturing images underwater used to estimate a physical dimension of an object located underwater, comprising:

at least one processor; and memory with instructions stored thereon, wherein the instructions upon execution by the at least one processor, cause the at least one processor to perform operations including:

obtaining an image of the object captured using a camera during an underwater deployment;

identifying at least two points of interest on the object in the image;

determining an image-space distance between the at least two points;

determining a location of a laser spot within the image, wherein the laser spot is incident on the object;

estimating a camera-to-object distance based on the location of the laser spot within the image and a calibrated spatial relationship between the camera and a laser source, wherein the calibrated spatial relationship is determined based on at least one calibration image acquired during the underwater deployment; and estimating the physical dimension of the object based on the image-space distance using the camera-to-object distance.

* * * * *